(12) United States Patent
Li et al.

(10) Patent No.: US 11,909,922 B2
(45) Date of Patent: *Feb. 20, 2024

(54) AUTOMATIC REACTION-TRIGGERING FOR LIVE PRESENTATIONS

(71) Applicant: Microsoft Technology Licensing, LLC, Redmond, WA (US)

(72) Inventors: Ji Li, San Jose, CA (US); Amit Srivastava, San Jose, CA (US); Derek Martin Johnson, Sunnyvale, CA (US); Priyanka Vikram Sinha, Sunnyvale, CA (US); Konstantin Seleskerov, Palo Alto, CA (US); Gencheng Wu, Campbell, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,918

(22) Filed: Jan. 18, 2023

(65) Prior Publication Data
US 2023/0156124 A1 May 18, 2023

Related U.S. Application Data

(63) Continuation of application No. 16/983,649, filed on Aug. 3, 2020, now Pat. No. 11,570,307.

(51) Int. Cl.
*H04M 3/56* (2006.01)
*G06N 3/08* (2023.01)
(Continued)

(52) U.S. Cl.
CPC ............. *H04M 3/568* (2013.01); *G06N 3/08* (2013.01); *H04L 12/1818* (2013.01);
(Continued)

(58) Field of Classification Search
CPC ... G06N 3/08; H04L 12/1818; H04L 12/1822; H04L 65/4015; H04L 65/403; H04M 3/568
See application file for complete search history.

(56) References Cited

U.S. PATENT DOCUMENTS

2014/0137144 A1* 5/2014 Jarvenpaa .......... H04N 21/6582
725/9
2020/0228359 A1* 7/2020 el Kaliouby ........ H04L 12/1827

* cited by examiner

*Primary Examiner* — Thomas J Dailey

(57) ABSTRACT

The present disclosure relates to processing operations configured to provide processing that automatically analyzes acoustic signals from attendees of a live presentation and automatically triggers corresponding reaction indications from results of analysis thereof. Exemplary reaction indications provide feedback for live presentations that can be presented in real-time (or near real-time) without requiring a user to manually take action to provide any feedback. As a non-limiting example, reaction indications may be presented in a form that is easy to visualize and understand such as emojis or icons. Another example of a reaction indication is a graphical user interface (GUI) notification that provides a predictive indication of user intent derived from analysis of acoustic signals. Further examples described herein extend to training and application of artificial intelligence (AI) processing, in real-time (or near real-time), that is configured to automatically analyze acoustic features of audio streams and automatically generate exemplary reaction indications.

20 Claims, 9 Drawing Sheets

(51) Int. Cl.
*H04L 12/18* (2006.01)
*H04L 65/401* (2022.01)
*H04L 65/403* (2022.01)

(52) U.S. Cl.
CPC ........ *H04L 12/1822* (2013.01); *H04L 65/403* (2013.01); *H04L 65/4015* (2013.01)

100

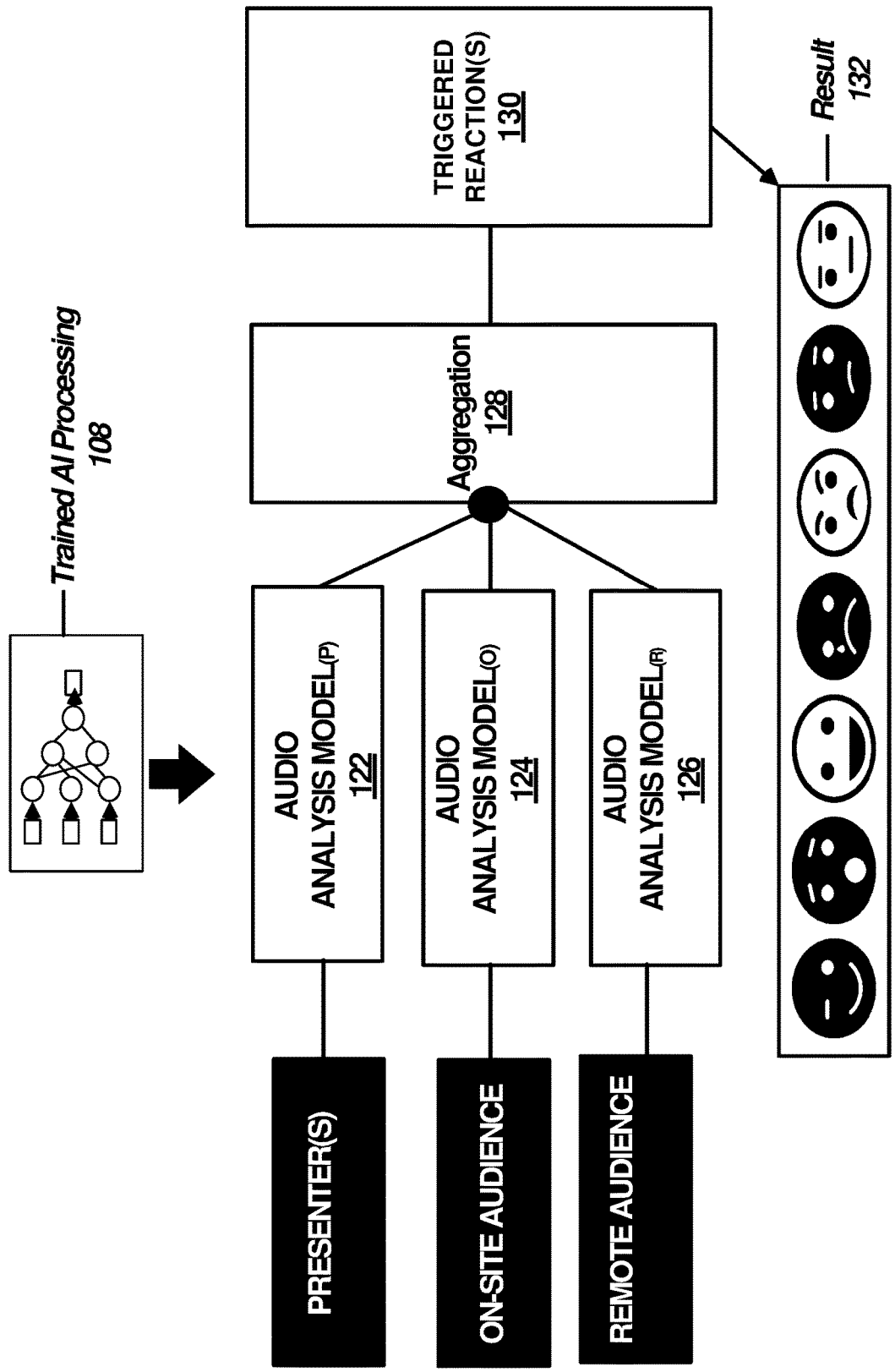

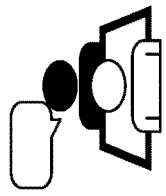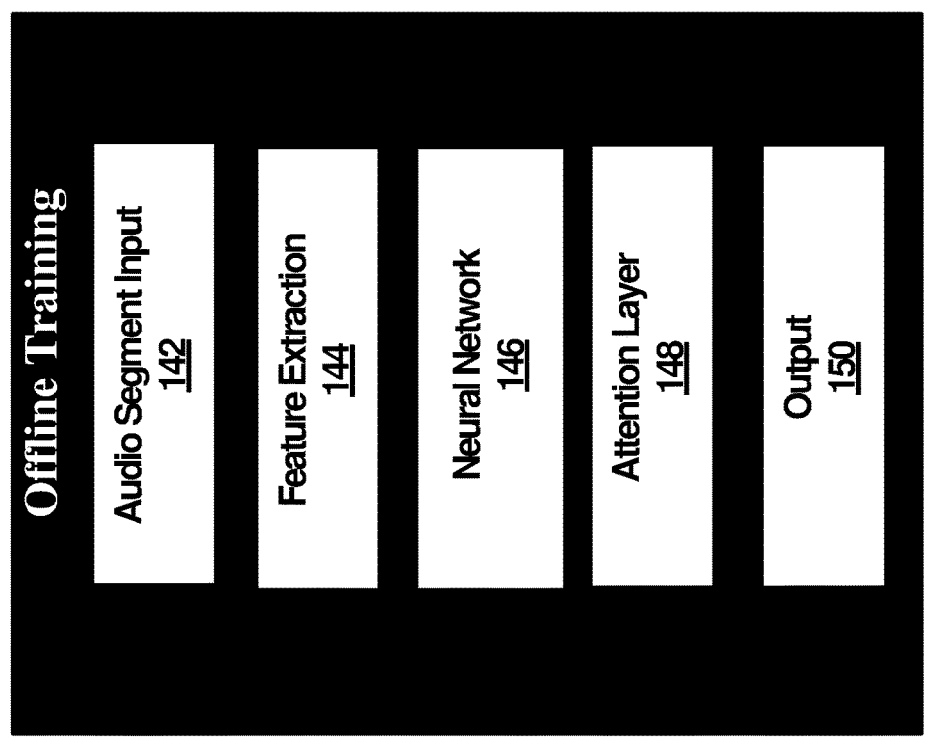
FIGURE 1C
140

160

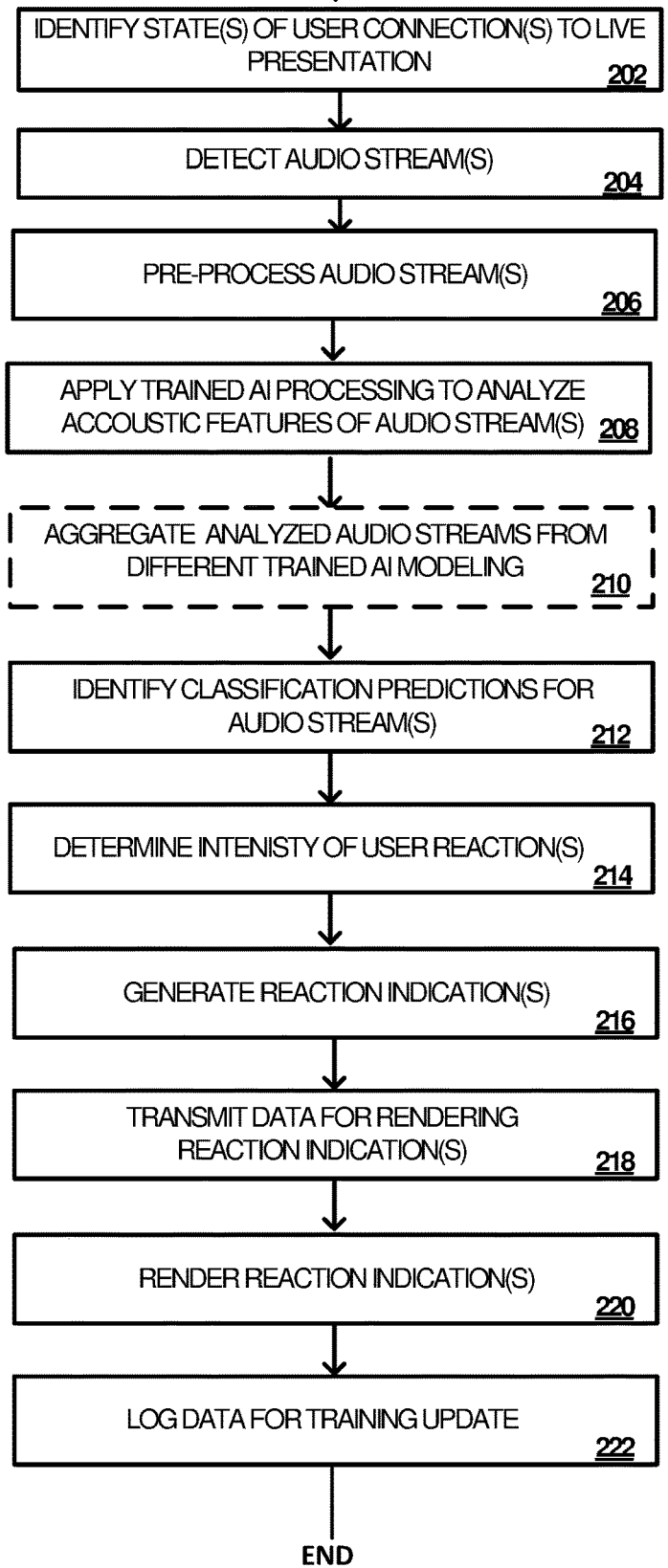

AUTOMATIC REACTION-TRIGGERING FOR LIVE PRESENTATIONS

CROSS REFERENCE TO RELATED APPLICATIONS

This application is a continuation of and claims priority under 35. U.S.C. § 120 to U.S. patent application Ser. No. 16/983,649, filed Aug. 3, 2020, entitled "AUTOMATIC REACTION-TRIGGERING FOR LIVE PRESENTATIONS," the contents of which is incorporated herein by reference in its entirety for all purposes.

BACKGROUND

Electronic meetings have become commonplace often replacing the need for users to conduct in-person meetings. While in-person meetings still commonly occur, there are a greater number of users that may join a meeting virtually either due to preference or requirement. Audio experiences may vary greatly as users may be electronically connecting from different locations and in different environments (e.g., home, busy coffee shops, airports, shared offices). Due to the high likelihood of background noise and the potential for interrupting a presenter, audience members often may turn off their audio so as not to distract or interrupt the presenter during a presentation. However, this greatly limits the ability of audience members to provide feedback in real-time for a presenter as the audience members have to remember to take action to unmute their audio, which may occur at a delay or even not at all (audience members often forget to do this). As such, there is a technical need automatic monitoring (with user consent) of audio signals even in instances where audio signals are not being presented for users of a meeting.

During a presentation, a presenter may often wonder how they are doing and what the audience thinks about their presentation. In traditional systems, audio signals are not traditionally monitored and analyzed during a presentation. This limits the ability of traditional systems to provide meaningful feedback derived from analysis of audio signals and even contemplate doing so in an automated manner without requiring user action. In some instances, presenters can manually request feedback from audience members. However, many audience members may not even respond to such a request. Furthermore, from processing and efficiency standpoints, requesting and discussing feedback during a meeting may ruin the flow of the meeting. An additional technical drawback is that requesting manual feedback may require more computing resources to be tied up to collectively manage a meeting. For instances, a service presenting a meeting would have to detect, decipher and process numerous extra manual actions from individual audience members.

When it comes to audio signal processing, larger numbers of attendees in a meeting results in a larger number of audio signals to process and report on. Traditional audio signal processing systems and methods are further limited in that they do not aggregate and collectively analyze acoustic signal data for groups of users. This can result in inefficient and distracting feedback results if any feedback results are even provided. For instance, if 50 audience members are present and each audience member responds (sometimes more than once), 50 (or more) points of feedback may be provided for a presenter to review and digest. This is likely too much data to be meaningfully understood and applied in real-time for a presenter to adapt a presentation.

Furthermore, when a plurality of users responded at once, responses from some users are often missed or completely drown-out by other audio feedback. As traditional systems and methods do not typically monitor and analyze audio signals for feedback provision during a presentation, those traditional systems and methods are unable to derive signal intent from audio and further fail to provide any type of data transformation thereof that can be useful to aid a presentation.

For the above technical problems and other reasons, there is a technical need for audio monitoring (with user consent), data analysis and data transformation that can result in the automatic provision of feedback during presentation of content.

SUMMARY

In view of the foregoing technical challenges, the present disclosure relates to processing operations configured to provide processing that automatically analyzes acoustic signals from attendees of a live presentation and automatically triggers corresponding reaction indications from results of analysis thereof. Exemplary reaction indications provide feedback for live presentations that can be presented in real-time (or near real-time) without requiring a user to manually take action to provide any feedback. As a non-limiting example, reaction indications may be presented in a form that is easy to visualize and understand such as emojis or icons. Another example of a reaction indication is a graphical user interface (GUI) notification that provides a predictive indication of user intent which is derived from analysis of acoustic signals. However, reaction indications may be present any type of content in any format without departing from the spirit of the present disclosure. Further examples described herein extend to training and application of artificial intelligence (AI) processing, in real-time (or near real-time), that is configured to automatically analyze acoustic features of audio streams and automatically generate exemplary reaction indications therefrom.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1B illustrates an exemplary process flow providing non-limiting examples of processing executed by exemplary trained Artificial Intelligence (AI) processing that is configured to aid automatic generate of reaction indications to live presentations, with which aspects of the present disclosure may be practiced.

FIG. 1C illustrates an exemplary process flow providing non-limiting examples of processing steps for offline training of AI processing that is configured to aid automatic generate of reaction indications to live presentations, with which aspects of the present disclosure may be practiced.

FIG. 2 illustrates an exemplary method related to automated processing of audio streams to generate reaction indications to a live presentation, with which aspects of the present disclosure may be practiced.

DETAILED DESCRIPTION

Figure 1A:
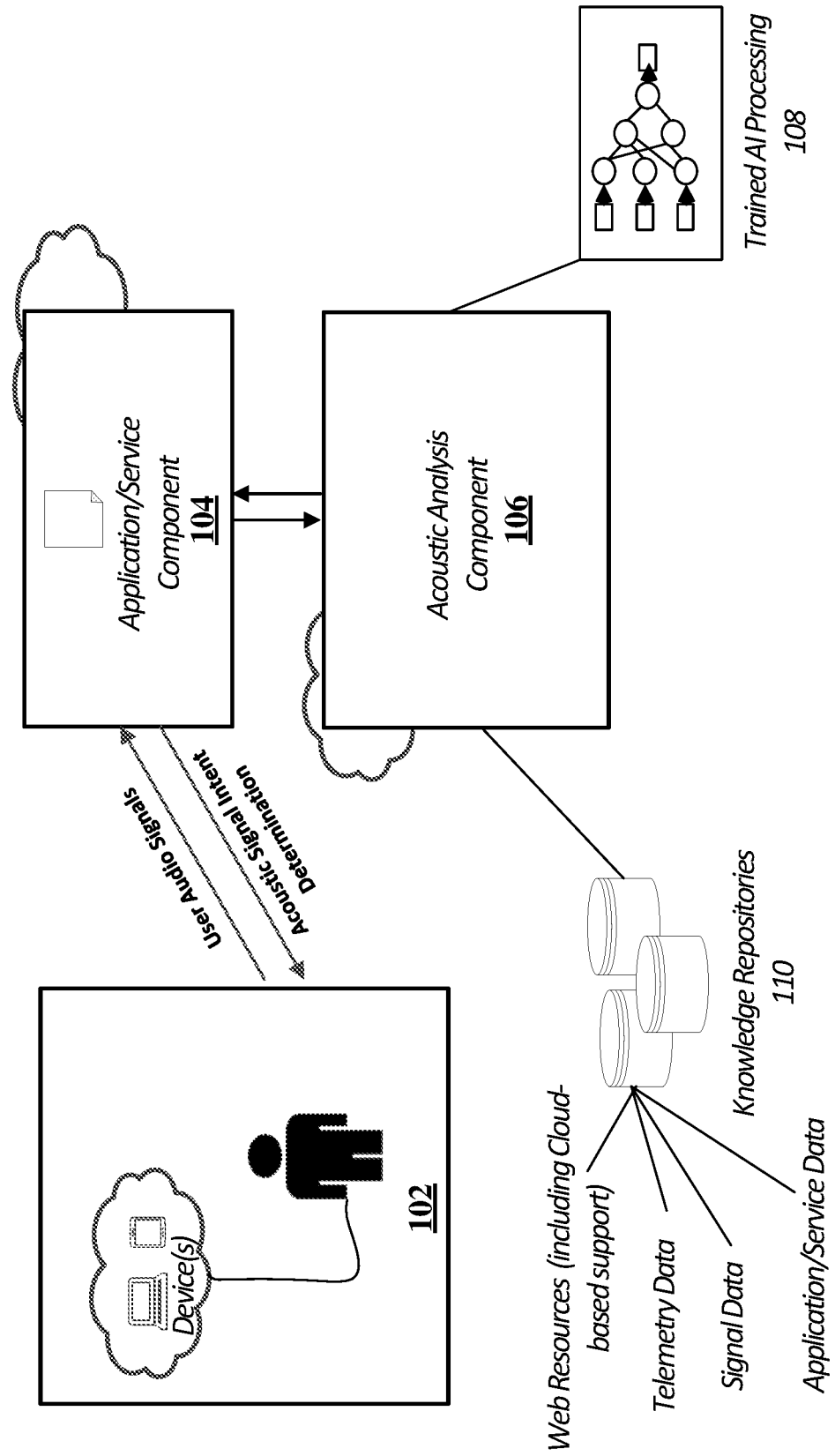
FIG. 1A illustrates an exemplary system diagram of components interfacing to enable automatic generation of reaction indications from acoustic analysis of audio streams during a live presentation, with which aspects of the present disclosure may be practiced.

As referenced in the foregoing, the present disclosure relates to processing operations configured to provide processing that automatically analyzes acoustic signals from attendees of a live presentation and automatically triggers corresponding reaction indications from results of analysis thereof. Exemplary reaction indications provide feedback for live presentations that can be presented in real-time (or near real-time) without requiring a user to manually take action to provide any feedback. As a non-limiting example, reaction indications may be presented in a form that is easy to visualize and understand such as emojis or icons. Another example of a reaction indication is a GUI notification that provides a predictive indication of user intent which is derived from analysis of acoustic signals. However, reaction indications may be present any type of content in any format without departing from the spirit of the present disclosure. Further examples described herein extend to training and application of AI processing, in real-time (or near real-time), that is configured to automatically analyze acoustic features of audio streams and automatically generate exemplary reaction indications.

As different types of audio signals may be received from different users during a presentation, the present disclosure intelligently applies trained AI processing that can contextually adapt to analyze acoustic features of multiple audio inputs and derive accurate results for determining feedback therefrom. For instance, trained AI processing may apply different audio analysis models that are trained and tuned to analyze audio streams in different contextual scenarios (e.g., from different users/user groups and/or different locations) and even when users may mute their audio but still consent to audio signal monitoring. As a non-limiting example, different audio analysis models may comprise models tuned to analyze audio of a presenter, onsite audience, and remote audience. Processing described herein may be configured to analyze multiple different types of audio input (e.g., audio streams) individually and concurrently, providing the ability to cross-reference different types of audio signal data to thereby improve predictive accuracy when classifying audio streams and generating exemplary reaction indications. Further, signal analysis from multiple different users of a group and/or different groups can be aggregated, where aggregated analytics can be utilized to improve generation of reaction indications. A type (or types) of content to include in a reaction indication may be selected based on a prediction result from acoustic analysis of one or more audio streams (by one or more trained audio analysis models) and/or application of controllable triggering rules that are configured to evaluate results derived from acoustic analysis of one or more audio streams.

Further advances in analysis of audio streams provided by the present disclosure comprise determination of an intensity of one or more audio streams. Audio streams can be filtered to identify frames that pertain to target classes each identifying specific user reactions that are identified by developers. An intensity of acoustic features from those filtered frames may be analyzed to improve the generation and provision of exemplary reaction indications. For instance, determination of intensity of one or more audio streams may be utilized to select one or more of: a size of the reaction indication (or content provided thereof); a quantity of content (e.g., icons/emojis) for inclusion in the reaction indication; an arrangement of content included in the reaction indication; and a layout of content included in the reaction indication, among other examples.

Moreover, non-limiting examples of the present disclosure further extend to improvements in a GUI of an application/service (e.g., presentation broadcast service) that may be adapted to provide application command control for management of a live presentation. Further, an adapted GUI may also be adapted to automatically provide reaction indication(s) based on a result of analyzing one or more audio streams without requiring a user to take manual action to provide feedback.

In one non-limiting example, an audio stream associated with a live presentation is detected and analyzed. For instance, the audio stream may be associated with a user (e.g., audience member) that is accessing a live electronic presentation through a presentation broadcasting service. One or more trained AI models may be selected and applied to analyze the audio stream based on identification of a classification of a user (e.g., audience member) or group of users from which the audio stream is received. Analysis of an identification of a locational classification (e.g., onsite or remote) of a user that is providing the audio stream may be used to select a specific model, from a plurality of applicable trained AI models, to apply to analyze acoustic features of the audio stream. Exemplary trained AI models are configured to automatically analyze acoustic features of the audio stream using first trained data trained to indicate target classes that each identify specific user reactions to the live electronic presentation and second trained data trained to indicate non-target classes that each identify audio types that are associated with the locational classification of the user.

Continuing the above example, trained AI modeling may be applied to identify frames of each of the plurality of audio streams that correlate with one or more of target classes identified from training data for the one or more trained AI models. Target classes may each pertain to specific user reactions that may occur during presentation of content as identified by developers. Analysis of acoustic features from the plurality of audio streams may be analyzed comparative with the training data to generate a prediction as to the type of audio in frames of an audio stream. This may comprise filtering out frames/audio streams that do not align with target classes (e.g., using the second trained data). Frames from audio streams that match target classes may then be utilized to generate a reaction indication. In some examples, trained AI processing may further comprise determining an intensity of the specific user reactions based on an aggregate evaluation analysis of audio data of the frames of each of the audio stream and/or other audio streams provided by other users (e.g., other audience members). A reaction indication may then be generated that provides a visual representation of a user reaction to the live presentation. Generation of an exemplary reaction indication may occur based on a result of analysis of the one or more frames of the audio stream that correlate with the one or more of the target classes. In some examples, this may comprise an evaluation of a type of the one or more target classes identified for the one or more frames of the audio stream and/or a determination of the intensity associated with the specific user reactions detected in the audio stream and/or in aggregate with other audio streams. In some examples, generation of an exemplary reaction indication may comprise application of controllable triggering rules (e.g., programmed rules) that are configured to evaluate results derived from acoustic analysis of one or more audio streams. The controllable triggering rules may be usable to generate one or more of: a classification prediction for a type of audio stream (or group of audio streams); a determination of user intent from an audio stream; a determination of how to aggregate frames/audio streams; selection of a representation of content to include in a reaction indication; selection of a layout and/or arrangement of content in a reaction indication; and determination of an intensity of one or more audio streams, among other examples.

Once an exemplary reaction indication is generated, processing may further proceed to render and present the reaction indication. In some examples, this may occur in a distributed fashion over a network connection through interfacing with an application/service (e.g., presentation broadcasting service) that may be presenting a GUI through which the reaction indication may be provided. In examples where components (e.g., acoustic analysis component) for analysis of an audio stream and generation of an exemplary reaction indication are executed by an application/service that is separate from an application/service that provides a GUI for a live presentation (e.g., presentation broadcasting service), processing operations may be executed to transmit, to the presentation broadcasting service over a network connection, data for rendering of the reaction indication. In some alternative examples, an acoustic analysis component may be an integrated component of an application/service (e.g., presentation broadcasting service) that provides a front-end GUI for presentation of an exemplary reaction indication where a reaction indication may then be automatically rendered for presentation through the GUI.

In another non-limiting example, a plurality of audio streams is detected and analyzed. For instance, the plurality of audio streams may be associated with users (e.g., audience members) that are accessing a live electronic presentation through a presentation broadcasting service. Similar to the examples described above, one or more trained AI models may be selected and applied to analyze the plurality of audio streams based on identification of a classification of a user (e.g., audience member) or group of users from which the audio stream is received. Analysis of an identification of the user associated with the audio stream (e.g., a locational classification (e.g., onsite or remote) of users that are providing the audio streams) may be used to select a specific model to apply to analyze acoustic features of the plurality of audio streams.

Continuing the above example, trained AI modeling may be applied to identify frames of each of the plurality of audio streams that correlate with one or more of target classes identified from training data for the one or more trained AI models. Exemplary training data is trained to identify specific user reactions to the live electronic presentation that are each associated with the one or more target classes. Analysis of acoustic features from the plurality of audio streams may be analyzed comparative with the training data to generate a prediction as to the type of audio stream. This may comprise filtering out frames/audio streams that do not align with target classes which may identify specific user reactions to a live presentation. Frames from audio streams that match target classes may then be utilized to generate a reaction indication. In some examples, trained AI processing may further comprise determining an intensity of the specific user reactions based on an aggregate evaluation analysis of audio data of the frames of each of the plurality of audio streams identified in the identifying. A reaction indication may then be generated that provides an aggregate visual representation of the specific user reactions to the live presentation. Generation of an exemplary reaction indication may occur based on evaluation of a type of the one or more target classes identified for the frames of each of the plurality of audio streams and/or a determination of the intensity associated with the specific user reactions. Once an exemplary reaction indication is generated, processing may further proceed to render and present the reaction indication. In some examples, this may occur through interfacing with an application/service (e.g., presentation broadcasting service) that may be presenting a GUI through which the reaction indication may be provided.

Exemplary technical advantages provided by processing described in the present disclosure comprise but are not limited to: application of acoustic signal analysis to automatically generate user feedback during a live presentation; training and tuning of AI modeling for specific types of users during a live presentation resulting in improved accuracy in predicting user feedback over general acoustic event classification; ability to concurrently process and analyze audio streams from a plurality of different users during a live presentation; ability to train AI modeling to utilize acoustic features to generate reaction indications; ability to automatically generate reaction indications; ability analyze intensity of audio streams and factor that analysis in generation of an exemplary reaction indication; improved processing efficiency (e.g., reduction in processing cycles, saving resources/bandwidth) for computing devices when analyzing audio streams during a live presentation and generating reaction indications; adapting and improving a GUI of an application/service to integrate GUI elements and generated reaction indications as described herein; reduction in latency through efficiently programmed/trained AI processing; implementation of a novel acoustic analysis component that is further configured to interface with a plurality of applications/services (e.g., applications/services of a distributed software platform) to extend functionality during processing; and improving usability of applications/services for users via integration of processing described herein, among other technical advantages.

FIG. 1A illustrates an exemplary system diagram 100 of components interfacing to enable automatic generation of reaction indications from acoustic analysis of audio streams during a live presentation, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in process flows 120-160 (FIGS. 1B-1D respectively), method 200 (FIG. 2), processing associated with visual diagrams of FIGS. 3A-3C and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform that also provides, to a component, access to and knowledge of other components that are associated with applications/services. In one instance, processing operations described in system diagram 100 may be implemented by one or more components connected over a distributed network, where a user account may be working with a specific profile established through a software data platform. System diagram 100 comprises user computing devices 102; an application/service component 104; an acoustic analysis component 106; a component 108 providing trained AI processing; and knowledge repositories 110.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or access a live presentation (e.g., live electronic presentation) through different user computing devices 102, where non-limiting examples of such are: a smart phone, a laptop, a tablet, a desktop computer, wearable computing device, etc. In other instances, a user may carry on a multi-modal communication with an application/service via multiple user computing devices.

A user may be accessing, through interfacing between a computing device 102 and an application/service component 104, one or more application/services that are used to execute any type of task including management of a live presentation. A live presentation may be an event where content is being presented in real-time (or near real-time) to one or more other users (e.g., audience members). In one example, a live presentation may be a live electronic presentation. However, processing described herein may be applicable to any type of live events including but not limited to: speeches, sporting matches, athletic tournaments, non-athletic competitions, artistic performances, musical concerts, among other live events. As such, in general terms, a live presentation may comprise a presenter and one or more other audience members.

In examples where a live presentation is a live electronic presentation, the live presentation enables users (e.g., presenters and audience members) to connect to content of a presentation through an application/service (e.g., presentation broadcasting service, unified communication and collaboration service, etc.) via one or more computing devices 102. In some instances, multiple applications/services may be used to enable a live presentation of content. For example, a presenter may access content and share its screen through one type of application/service (e.g., unified communication and collaboration service or platform) and then utilize a presentation broadcasting service to enable users to connect to presented content. Audience members may take part in the live presentation as a live audience/on-site audience or may be connected to the live presentation remotely (e.g., off-site/remote audience). While some live presentation examples may comprise both on-site audience members and remote audience members, it is likely that one or more audience members may be connected to a presentation through a computing device 102 (e.g., via network connection). Even in instances where on-site audience members are physically present for a live presentation, such audience members may be still connected to the presentation electronically through a computing device (e.g., computing device 102). For instance, access to content of the live presentation (e.g., live electronic presentation) may be provided through a selection of a web link, scanning of a quick response (QR) code, selection of GUI elements from an application command control of an application/service, or the like.

An application/service that the user is accessing is configured to provide a user interface or GUI that enables access to content (e.g., electronic documents) and live presentations thereof. Exemplary functionality described herein including an improved user interface may be provided through an application/service component 104 that is configured to enable applications/services to be accessed by users and presented on a user computing device 102. An example user interface may be adapted to provide new functionality described herein, where back-end processing as well as front-end user interface features and application command control are described that is not present in traditional user interface systems. Intelligent processing operations are described herein that enhance user experience and processing efficiency during live presentation (e.g., live electronic presentation) of content. Processing device views that illustrate non-limiting user interface examples of the present disclosure are provided in FIGS. 3A-3C.

An electronic document (or electronic file) is a representation of content in an electronic media/electronic format such as a digital file. Examples of electronic documents may vary, where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored locally on a client computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. Electronic documents may also include message content examples such as email messages, instant text messages and social media postings, among other examples. As a non-limiting example, an electronic document may be a slide-based presentation document, where access is provided through a digital presentation application/service, distributed storage, etc.

As referenced above, exemplary applications/services may interface with other components of process flow 100 to enhance processing efficiency and functionality as described herein. The application/service component 104 is configured to interface with other components of process flow 100 including computing device(s) 102 and the acoustic analysis component 106. Applications/services may be any type of programmed software. The acoustic analysis component 106 may be configured to interface with any type of application/service, providing analysis of audio streams and generation of reaction indications for any type of content. An exemplary application/service is a productivity application/service that is configured for execution to enable users to complete tasks on a computing device, where exemplary productivity services may be configured for access to live presentations. Examples of productivity services comprise but are not limited to: word processing applications/services, spreadsheet applications/services, notes/notetaking applications/services, authoring applications/services, digital presentation applications/services, presentation broadcasting applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). Moreover, specific application/services (including those of a distributed software platform) may be configured to interface with other non-proprietary application/services (e.g., third-party applications/services) to extend functionality including data transformation and associated implementation.

The application/service component 104 is configured to interface with user (through the user computing device 102) as well as the acoustic analysis component 106, component 108 for trained AI processing and knowledge repositories 110 (e.g., of a distributed software platform). In doing so, signal data may be collected by either: the application/service component 104; or the acoustic analysis component 106 via the application/service component 104, to enable contextual processing of audio streams and generation of exemplary reaction indications therefrom. In one example, an exemplary presentation broadcasting service may be an individual service that is specifically configured to manage one or more instances of live presentations. In another example, a presentation broadcasting service may be a component of a presentation service (e.g., Microsoft® PowerPoint®) that provides access to live presentations as a feature of the presentation service. The application/service component 104 interfaces with a user computing device 102 to receive audio signals (e.g., audio streams) from users of a live presentation and then return an acoustic signal intent determination. An exemplary signal intent determination may comprise any of an exemplary reaction indication or other type of GUI notification indicating a predicted intent of a user from analysis of acoustic features of user audio signals. Exemplary reaction indications provide feedback for live presentations that may comprise a visual indication of a state of user feedback which can be presented in real-time (or near real-time) without requiring a user to manually take action to provide any feedback. Any type of content may be included in a reaction indication including but not limited to: notifications; emojis; icons; data objects (including rich/complex data objects that comprise selectable links/content); graphs and telemetry data analysis; pictures and/or videos; and handwritten content/notes, among other examples. As an example of other types of GUI notifications pertaining to signal intent determination may be a predictive indication of user intent which is derived from analysis of acoustic features of audio signals. Non-limiting examples of such predictions comprise but are not limited to: predictions as to whether a user intends to ask a question, interject, provide verbal feedback, etc.

The application/service component 104 is further configured to present, through interfacing with the acoustic analysis component 106, an adapted GUI that provides user notifications, GUI menus, GUI elements, etc., to manage control over detection/analysis of audio streams and provision of exemplary reaction indications. For instance, a GUI of an application/service may be configured to provide a user interface element that provides reaction indications in real-time (or near real-time). An application command control (e.g., user interface ribbon) may be adapted to include a selectable user interface feature to initiate control monitoring of audio streams and presentation of reaction indications. For instance, a presenter of a live presentation may utilize GUI elements to manage whether they would like to receive reaction indications in real-time, as a reporting after the occurrence of a live presentation, a combination thereof, etc. Non-limiting visual examples of user interface elements pertaining to application command control and provision of reaction indications are provided in FIGS. 3A-3C.

The acoustic analysis component 106 is one or more components configured to execute and manage processing operations related to detection/receipt of audio streams, analysis of audio streams (e.g., acoustic features thereof); and generation and provision of exemplary reaction indications. The acoustic analysis component 106 may be configured to execute any processing operations described herein, including those described relative to process flows 120-160 (FIGS. 1B-1D respectively), method 200 (FIG. 2), processing associated with visual diagrams of FIGS. 3A-3C and the accompanying description. While reference is provided to specific processing operations executable by the acoustic analysis component 106 in the subsequent process flows and methods, non-limiting examples of types of processing operations executed by the acoustic analysis component 106 may comprise but are not limited to: audio stream processing including detection and/or receipt of raw audio stream data from a live presentation and frame level feature analysis and extraction; trained AI processing management including model selection and application in different contextual scenarios; generation and management of data sets used to build, train and tune AI processing; offline training of AI processing; management of online data surfing for real-time (near real-time) analysis of audio streams from a live presentation including acoustic feature evaluation; target/non-target class analysis of audio streams (e.g., including application of a sliding window for analysis of extracted features from audio stream frames); model output aggregation, prediction and reaction triggering including generation of exemplary reaction indication; and management of transmission of data for rendering/provision of exemplary reaction indications including communications with other applications/services, among other examples.

As referenced in the foregoing description, audio streams may be analyzed to generation reaction indications that can be provided proximate to a live presentation (e.g., before, during or after). Audio streams may pertain to audio signals detected during a live presentation, whether the audio signals are detected through a client computing device of a user connected to a live presentation and/or computing devices in a physical location (e.g., meeting room) of a live presentation. Audio streams may be detected in any number of different technical configurations including but not limited to: by the acoustic analysis component 106; and by an application/service component 104, interfacing with the acoustic analysis component 106, that may propagate audio signal data to the acoustic analysis component 106 for analysis as described herein. In different technical examples, there may be various triggers for capture and analysis of audio streams during a live presentation. General processing operations for detection of audio input is known to one skilled in the field of art. For instance, a component such as the acoustic analysis component 106 may be configured to detect audio signal data from users associated with a live presentation via an API or listener component. Above what is traditionally known, the acoustic analysis component 106, may analyze audio signal data in a novel way as well as transform analysis results therefrom into a practical application to improve live presentations through the provision of exemplary reaction indication.

As different types of audio signals may be received from different users during a presentation, the present disclosure, through the acoustic analysis component 106, intelligently applies trained AI processing that can contextually adapt to analyze acoustic features of multiple audio inputs and derive accurate results for determining feedback therefrom. For instance, trained AI processing, executed by component 108, may apply different audio analysis models that are trained and tuned to analyze audio streams in different contextual scenarios (e.g., from different users/user groups and/or different locations). As a non-limiting example, different audio analysis models may comprise models trained and tuned to analyze audio of a presenter, onsite audience, and remote audience, among other types of user groups that may join a live presentation. Processing described herein may be configured to analyze multiple different types of audio input (e.g., audio streams) individually and concurrently, providing the ability to cross-reference different types of audio signal data to thereby improve predictive accuracy when classifying audio streams and generating exemplary reaction indications. Further, signal analysis from multiple different users of a group and/or different groups can be aggregated, where aggregated analytics can be utilized to improve generation of reaction indications.

User connection to a live presentation (e.g., via connection to a specific live presentation of the presentation broadcasting service or the like) may be a trigger for initiation of execution of processing operations to analyze audio streams of users. In some technical examples, users may consent to analysis of their audio streams at a time prior to connection to a live presentation, thereby enabling analysis of audio streams unless the user manually opts out or deactivates audio stream monitoring. In other examples, a trigger for initiation of analysis of audio streams of users during a live presentation may be user selection of a GUI element (e.g., enable audio monitoring) that is configured to provide consent to allow audio inputs to be analyzed from client computing devices. In any case, it is important to note that any processing described herein is executed in compliance with data retention and data privacy laws, policy and regulations including those that require user consent. This may further comprise analysis of muted audio signals when consent is provided by users to monitor their audio streams.

The acoustic analysis component 106 may be further configured to interface with the application/service component 104 to enable presenters of a live presentation to control how and when audience feedback may be presented. For instance, a presenter may toggle whether user feedback is displayable during a live presentation. Some presenters may prefer to see user feedback in real-time and adjust accordingly during a presentation while others may prefer to see user feedback after a live presentation has been completed (e.g., in a summary reporting of the live presentation or summary of feedback provided prior to a live presentation such as in anticipation/hype of the live presentation). Furthermore, users accessing a live presentation may toggle, through an application/service, control over whether their audio input is to be monitored. In any example, the acoustic analysis component 106 interfaces with the application/service component 104 to manage transmission of data including signal data indicating user preferences for receiving content, having audio input monitored, etc. For instance, if a presenter disables provision of user feedback during a live presentation, the application/service component 104 may be configured to notify the acoustic analysis component 106 which may affect transmission of data for rendering of a reaction indication or ultimately a timing of when a reaction indication is rendered. In instances where audio input is not enabled for transmission during a live presentation (e.g., an audience member does not want their audio input to be output to other users), the acoustic analysis component 106 may still be configured to analyze audio streams and generate reaction indications. Such processing may be beneficial for training purposes or generation of a summary of user feedback that may be provided to the presenter and/or audience members after the conclusion of a live presentation, for example, in a summary report through an exemplary presentation broadcasting service or alternatively through a different modality (e.g., email, messaging).

The acoustic analysis component 106 is configured to provide comprehensive analysis of acoustic features from audio data in an accurate and efficient manner. In doing so, the acoustic analysis component 106 may be configured to execute processing operations thereof via a programmed software module, trained AI processing (e.g., application of a trained machine learning modeling including neural networks and/or transformers) or a combination thereof. With respect to execution of trained AI processing (e.g., component 108), the acoustic analysis component 106 interfaces with a component 108 that manages trained AI processing and knowledge repositories 110 to access trained classifiers (and corpuses of trained data) to achieve processing described herein. As an example, the acoustic analysis component 106 interfaces with the component 108 for trained AI processing in a distributed manner via a network connection. Communications between components to enable interfacing therebetween is known to one skilled in the field of art.

As the acoustic analysis component 106 is configured to execute complex and comprehensive analysis, multiple different layers of AI processing may be implemented in aggregate to achieve processing results described herein. For instance, the acoustic analysis component 106 may be configured to apply different audio analysis models that are trained and tuned to analyze audio streams in different contextual scenarios (e.g., from different users/user groups and/or different locations). Processing described herein may be configured to analyze multiple different types of audio input (e.g., audio streams) individually and concurrently, providing the ability to cross-reference different types of audio signal data to improve predictive accuracy when classifying audio streams and generating exemplary reaction indications. While in some instances one specific model may be trained to execute the various processing operations (e.g., with multiple trained classifiers), in many technical examples additional AI processing and/or programmed software modules may be applied to aid data transformation based on results of analyzing audio signals/streams above models specifically tuned for acoustic analysis. For example, trained AI modeling, separate from audio analysis models (e.g., specifically trained AI models), may be applied to: aggregate prediction results from applied acoustic models; apply controllable triggering rules that are configured to evaluate results derived from acoustic analysis of one or more audio streams; execute intensity analysis and generation of determinations therefrom; derive user intent from analysis of acoustic features of audio streams; and generation of exemplary reaction indications, among other examples. Training and tuning AI modeling for specific technical purposes may further make run-time execution smoother and more efficient from a processing standpoint.

In cases where trained AI processing is applied, general application of trained AI processing including creation, training and update thereof is known to one skilled the field of art. Above what is traditionally known, trained AI processing may be adapted to execute specific determinations described herein with reference to the acoustic analysis component 106 and processing operations executed thereby. Exemplary AI processing may be applicable to aid any type of determinative or predictive processing by the acoustic analysis component 106, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples.

Furthermore, a component 108 providing trained AI processing may be configured to apply a ranker to generate scoring to assist with any processing determinations by the acoustic analysis component 106. Non-limiting examples of application of confidence scoring that may be applied to aid decision making comprise but are not limited to: scoring for classification predictions for types of audio streams (e.g., generation of classification predictions of target classes and non-target classes from frame analysis of audio streams); scoring to predict a user intent from an audio stream; aggregations scoring for cross-model analysis that may aid classification predictions, scoring for intensity determinations from analysis of frames of one or more audio streams; scoring generation of reaction indications from analysis of frames of one or more audio streams; and scoring for application of controllable triggering rules to aid any of the determinations previously referenced, among other examples.

As referenced in the foregoing description, knowledge repositories 110 may be accessed to obtain data for generation, training and implementation of the programmed software module/trained AI processing 108. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the acoustic analysis component 106. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers; access to audio signal data databases including identification of audio datasets (e.g., both target and non-target classes) usable for acoustic feature analysis of audio frames; web-based resources including any data accessible via network connection including data stored via distributed data storage; trained bots including those for natural language understanding; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend audio signal analysis including the conversion of audio signals to text for analysis as well as execution of frame analysis on audio streams. The cloud-assistance service may provide the acoustic analysis component 106 and/or application/service component 104 with access to larger and more robust library of stored data for execution of language understanding/natural language understanding processing. Access to the cloud-assistance service may be provided when an application/service is accessing content in a distributed service-based example (e.g., a user is utilizing a network connection to access an application/service), as the data of the cloud-assistance service may be too large to store locally. In further examples, the acoustic analysis component 106 may be configurable to interface with a web search service, entity relationship databases, etc., to extend a corpus of data to make the most informed decisions when generating determinations on behalf of a user. In even further examples, telemetry data may be collected, aggregated and correlated (e.g., by an interfacing application/service) to further provide the acoustic analysis component 106 with on demand access to telemetry data which can aid determinations generated thereby.

FIG. 1B illustrates an exemplary process flow 120 providing non-limiting examples of processing executed by exemplary trained AI processing that is configured to aid automatic generate of reaction indications to live presentations, with which aspects of the present disclosure may be practiced. Process flow 120 comprises a process flow that illustrates a flow of processing executed by the acoustic analysis component 106 (FIG. 1A) via the component 108 for trained AI processing. As referenced in the foregoing description, the present disclosure intelligently applies trained AI processing that can contextually adapt to analyze acoustic features of multiple audio inputs and derive accurate results for determining feedback therefrom. For instance, trained AI processing may apply different audio analysis models that are trained and tuned to analyze audio streams in different contextual scenarios (e.g., from different users/user groups and/or different locations). As a non-limiting example, different audio analysis models may comprise models tuned to analyze audio of a presenter, onsite audience, and remote audience. However, it is to be understood that the present disclosure applies to training/tuning audio analysis models for any type of user that may attend a live presentation so as to improve the accuracy and efficiency in determining user intent (e.g., user reactions/feedback). Processing described herein may be configured to analyze multiple different types of audio input (e.g., audio streams) individually and concurrently, providing the ability to cross-reference different types of audio signal data to improve predictive accuracy when classifying audio streams and generating exemplary reaction indications. Further, signal analysis from multiple different users of a group and/or different groups can be aggregated, where aggregated analytics can be utilized to improve generation of reaction indications.

As shown in process flow 120, processing may be executed that analyzes audio signal data using user-specific models depending on the types of audio signals that a user of that classification can expect to experience (e.g., environment of user classification) and/or location from where an audio signal is detected from. While process flow 120 shows classification of users as presenters, on-site audience and remote audience, it is to be understood that the present disclosure extends to those example where there may be additional curation of user classes that may result in additional trained models being used to analyze acoustic features of an audio stream. For instance, a class of remote audience may be broken down into different locational classifications (e.g., home, office, public transportation, outdoors, etc.), where an audio analysis model trained and tuned to understand acoustic features in those different contextual scenarios so as to filter out background noise, understand intensity of user reactions, etc.

In the process flow diagram of process flow 120, signal data detected with specific types of users such as presenters, on-site audience and remote audience may be identified. Based on the classification of the type of user from which an audio signal is detected, one or more trained AI models may be selected and applied to analyze the audio stream. In the example shown in process flow 120, separate audio analysis models (e.g., specifically trained AI models) may be applied to audio data received from each of the specific user classifications. For instance, audio data received for a presenter may be analyzed by audio analysis model$_{(P)}$ 122, audio data received from one or more on-site audience members may be analyzed using audio analysis model$_{(O)}$ 124 and audio data received from one or more audience members of the remote audience may be analyzed using audio analysis model$_{(R)}$ 126.

Each independent AI model (models 122-126) may be trained on the same weakly labeled audio event datasets but tuned differently to account for acoustic environments and predictive intended audio types that are likely to be received for a specific user classification. For instance, each AI model may be trained to identify target reaction classes that indicate predicted user reactions to presentation of content, which may occur based on analysis of acoustic features of audio signal data. Exemplary acoustic features that may be extracted and analyzed and subsequently used to correlate audio signal data with trained classes of audio may comprise but are not limited to: filter, bank, pitch, formant, probability of voicing, and harmony, among other examples. As an example, a target reaction class (target class) like clapping/cheering is separated out from the audio event datasets and shared among AI models 122-126 ($M_P$, $M_O$ and $M_R$). This may provide a baseline for identifying specific user reactions that may be utilized to classify audio streams (or frames thereof) during real-time online data surfing. Non-limiting examples of target classes (target reaction classes) comprise but are not limited to: clapping, cheering, yelling (e.g., hooting, or positive/negative short phrases), booing, and sleeping (e.g., snoring), among other examples. In some examples, user profiles associated with identifiable users (e.g., having a user account with an application/service, software platform) may be retained where specific attributes of audio (e.g., voice, speaking pattern) may be identifiable and used to help determine whether a user reaction is specific to a user that is audience member of a presentation or just some other form of background noise that is not intended as a reaction to a live presentation. In some technical instances, exemplary AI models may further be trained based on such data, where user-specific AI modeling can be generated and utilized in contextually relevant scenarios such as when a specific user is engaged in a live presentation. For example, a user yelling or talking in the background location of a remote audience member can be filtered out to identify that that the user attendee is not the one who is making the noise and/or the noise is not related to a user reaction to the live presentation.

Moreover, as identified above, specific AI models may be tuned individually to identify non-target classes of audio. Non-target classes of audio comprise anything that is not reaction-related audio. Filtering out this type of audio is extremely useful especially when audio datasets can be tuned for specific classifications of users that are directed to the types of audio sounds that can be expected for a user a location that a user may be attending a live presentation from. With respect to non-target classes of audio, additional sub-categorizations may be made to help fine-tune the specific AI modeling. As an example, non-target classes may be split into major and minor classes. The major class is a classification of audio types that is very likely to occur for certain types of participants based on a specific classification (presenter/on-site audience/remote audience), whereas minor classes may happen sometimes or occasionally for certain types of participants of that given classification. For instance, human speech is in the major class for presenter/onsite audience but will not be for remote audience. Street background sound/silence may be in major class for remote audience but not for presenter/on-site audience. Major and minor classes may be set relative to user classifications and/or locational environmental conditions associated with a specific user. Developers may preset major and minor classes of non-target audio and continuously update/modify such designations over time without departing from the spirit of the present disclosure.

As identified above, audio data sets may be weakly labeled data. Data that is weakly labeled is intended to mean that acoustic events of the data happen in a clip of a predetermined amount of time (e.g., 10 seconds) but may not last the entire clip duration. As such, the AI models are tuned to better classify target and non-target classes associated with a specific AI model (model 122-126). Tuning processing may comprise dividing an audio clip/stream into segments of a predetermined duration (e.g., 1 second) and labeling the data for that segment and the overall audio clip/stream. In doing so, segments associated with a specific audio clip/stream may inherit parent labels (e.g., labels for the entirety of the audio clip/stream). Furthermore, labels used for tuning classification may be multi-class multi-label, where labels can be used to identify multiple acoustic events in a segment and/or audio stream. This is extremely helpful when audio instances occur in real-time that have multiple acoustic events, which can be difficult to decipher in a timely manner when applying traditional acoustic analysis methods. Tuning may further comprise applying offline training to enhance the specific AI models (122-126) as described in greater detail in process flow 140 (FIG. 1C).

As referenced in the foregoing description, audio streams may be processed concurrently across the different user classifications (e.g., presenter, on-site audience, remote audience). Respective AI models may be applied using classifiers trained to analyze acoustic features of audio signal data relative to target and non-target classes. Each AI model applied may generate a model prediction for a frame of an audio stream. Results of application of respective AI models may be propagated to processing operation 128, where an aggregation evaluation of one or more audio streams may commence so that a classification prediction can be generated for the one or more audio streams.

The aggregate evaluation 128 is configured to utilize results from one or more of the respective AI models (122-126) and generate a classification prediction (in aggregate) for a type of audio of and/or intensity of one or more audio streams. In essence, the audio analysis modeling may be used to analyze and generate scoring for evaluation of acoustic features of frames in an audio stream and the aggregation component 128 is utilized to aggregate data from one or more audio streams so that the one or more audio streams can be further interpreted (e.g., for generation of a reaction indication). In doing so, controllable triggering rules may be applied to aggregate results from analysis of frames of one or more audio streams. Controllable triggering rules (or programmed rules) are predetermined rules configured that are utilized to generate or trigger a classification prediction for one or more audio streams as well as determine how to generate an exemplary reaction indication. Controllable triggering rules may be executed via a programmed software module (e.g., program code by developers) or programmed as features in trained AI processing. The controllable triggering rules may be set by developers and adapt over time to developer preferences for generating conclusions for determining how to present user reactions from evaluation of acoustic features of audio streams. Classification predictions may pertain to a type classification of one or more audio streams and/or an intensity classification of one or more audio streams. As such, the controllable triggering rules may be usable to evaluate any aspect for of audio streams including a type classification of audio streams, determination as to user intent from an audio stream; determination of a cross-model correlation between audio streams analyzed by different models, aggregation of data from audio streams, determination of intensity of audio streams and generation of reaction indications, among other examples.

To improve processing efficiency and reduce latency, some of the controllable triggering rules, when applied, may be configured to filter out frames and/or audio streams that do not appear to correlate with one of the target classes of a trained AI model. This may remove the need for subsequent processing to be applied to every audio stream even when it may be discarded or not used for generation of a reaction indication. For example, a threshold (e.g., confidence scoring) may be set to determine if one or more frames of an audio stream comprises audio signal data that correlates with a target class. In cases where audio signal data does not correlate with a target class, that audio may be discarded from further analysis. In some instances, that data may be still be logged for training purposes. In another example, some controllable triggering rules may be set to require that two or more frames of an audio stream correlate with a target class. As such, threshold requirements for determining whether to generate a reaction indication may vary according to developer specifications without departing from the spirit of the present disclosure.

In examples where a threshold number of frames comprise acoustic features that correlate with one or more target classes, controllable triggering rules may further be utilized to determine a prediction classification for one or more audio streams. For example, controllable triggering rules may be applied to generate a determination as to a prediction classification for one or more audio streams or a user intent derived from an audio stream based on evaluation of: one or more types of audio detected in individual frames of an audio stream/streams and/or the number of frames in an audio stream/streams that comprise acoustic features that correlate with a specific target class. As indicated in the foregoing description, this may occur based on evaluation of aggregated data for one or more audio streams. Classification predictions for audio streams (e.g., all analyzed audio streams or a subset of filtered audio streams) may be propagated for intensity analysis, for example, before generation of an exemplary reaction indication.

In some additional examples, controllable trigger rules may further be applied to cross-reference audio signal data from different groups of users. For instance, an additional layer of evaluation may be executed that correlates a classification prediction from one group of users associated with a live presentation (e.g., presenter) with one or more other groups of users (e.g., audience members) associated with a live presentation. If applied, this may be one supplemental way to help confirm accuracy of a prediction by helping to decipher whether potential user reactions are actually directed to the presenter of a live presentation. Consider an example where a remote audience member is in a room with their dog and the dog is misbehaving. It is possible that the audience member may clap to get the dogs attention, which is obviously not intended as a reaction to the live presentation. In that scenario, correlation of signal data associated with the presenter and the audience member may attempt to determine if the clap of the audience member occurs when the presenter is mid-speech. Combine this insight with the types of audio signal data detected in the audience members' audio streams (e.g., dog barking) and there may be a more accurate indication as to whether a user reaction is intended for a live presentation. In further examples, aspects of presenter speech may be analyzed to help correlate audience member reactions with what is happening during the live presentation. For instance, the presenter may speak keywords (e.g., "end", "thank you", "feedback", "questions") which may be indicators that the presenter is looking for a reaction from the audience members. Combine this with potentially timed pauses in speech or silence from the presenter, which may be detected through acoustic analysis of audio streams, and there may be a good indication that audio streams from the audience members may be intended as user reaction to the live presentation. As such, controllable triggering rules may be set by developers to cover scenarios where results of analysis of audio signal data from different audio analysis models may be utilized to help improve the accuracy in gauging user reactions.

Further advances in analysis of audio streams provided by the present disclosure comprise determination of an intensity of one or more audio streams. Audio streams can be filtered to identify frames that pertain to target classes each identifying specific user reactions. An intensity of acoustic features from those filtered frames may be analyzed to improve the generation and provision of exemplary reaction indications. An exemplary intensity refers to an acoustic or sound intensity per frame of audio (acoustic features) in an audio stream, which can be aggregated to determine an overall intensity of one or more audio streams. As indicated in the foregoing description, controllable triggering rules may further be set to derive an intensity prediction from analysis of acoustic features of one or more audio streams. Developers may set controllable triggering rules to identify threshold determinations regarding aggregated characteristics from frames of one or more audio streams to determine attributes of sound intensity including but not limited to: an evaluation of a loudness of a type of audio event for one or more users; an evaluation of a length of a type of audio event for one or more users (e.g., how many frames of an audio stream does the audio event last); and an evaluation of an aggregate number of users who provide an audio event (e.g., how many users out of one or more groups of users), among other examples.

As indicated in the foregoing, an intensity evaluation of the present disclosure enables the acoustic analysis component 106 to gain an aggregate understanding of an audio stream or group of audio streams (e.g., from a plurality of users). This evaluation can help determine how to present a reaction indication. For instance, determination of intensity of one or more audio streams may be utilized to select one or more of: a size of the reaction indication (or content provided thereof); a quantity of content (e.g., icons/emojis) for inclusion in the reaction indication; an arrangement of content included in the reaction indication; and a layout of content included in the reaction indication, among other examples. In examples where a reaction indication is generated for a plurality of audio streams (e.g., of a group of users), intensity determinations may be used to reflect the collective (or aggregate) view of a plurality of users. For instance, an aggregate reaction indication may be generated for a group of users that presents a summarized representation of content for a group of users rather than providing individual icons representative of each response by an audience member.

Flow of process flow 120 may proceed to processing operation 130 where a triggered reaction is generated. A triggered reaction may be generated based on a result of the aggregation analysis (processing operation 128). As indicated in the foregoing, a triggered reaction may be a reaction indication. Exemplary reaction indications provide feedback for live presentations that can be presented in real-time (or near real-time) without requiring a user to manually take action to provide any feedback. As an example, a reaction indication may then be generated that provides a visual representation of a user reaction to the live presentation. Generation of an exemplary reaction indication may occur based on a result of analysis of the one or more frames of the audio stream that correlate with the one or more of the target classes and/or non-target classes. In some examples, this may comprise an evaluation of a type of the one or more target classes identified for the one or more frames of the audio stream and/or a determination of the intensity associated with the specific user reactions detected in the audio stream and/or in aggregate with other audio streams. Exemplary reaction indications may be presented in a form that is easy to visualize and understand such as emojis or icons. Another example of a reaction indication is a GUI notification that provides a predictive indication of user intent which is derived from analysis of acoustic signals. However, reaction indications may be present any type of content in any format without departing from the spirit of the present disclosure.

In some instances, exemplary controllable triggering rules may be usable to generate a reaction indication. In other instances, types of reactions indications and layouts of content thereof may be preset and selected based on the classification prediction identified. In examples where reaction indications are contextually customized, controllable triggering rules may comprise rules set to determination how to select content to include in a reaction indication; a user intent from an audio stream; rules specific to the selection of a layout and/or arrangement of content in a reaction indication; and rules set specifically to select a size or amount of content (e.g., icons) to include in a reaction indication, among other examples. For example, controllable triggering rules may be set to determine how to generate a reaction indication based on any attributes associated with a classification prediction for one or more audio streams including the type classification of an audio stream and an intensity evaluation thereof.

Once an exemplary reaction indication has been generated, flow of process flow 120 may proceed to processing operation 132, where a result is provided for rendering. Non-limiting examples of reaction indications have already been described in the foregoing description. As a non-limiting example, a reaction indication may comprise one or more icons (e.g., emojis) which are reflective of a user reaction (or aggregate user reactions) to a live presentation. An exemplary reaction indication may be rendered through a GUI of an application/service such as a presentation application/service, presentation broadcasting application/service, etc.

FIG. 1C illustrates an exemplary process flow 140 providing non-limiting examples of processing steps for offline training of AI processing that is configured to aid automatic generate of reaction indications to live presentations, with which aspects of the present disclosure may be practiced. Processing operations to generate audio analysis models and tuning of audio analysis models has been provided in the foregoing description. Process flow 140 provides non-limiting examples of methods of training AI processing which can improve accuracy and efficiency of audio analysis models during run-time execution (e.g., online surfing in distributed fashion).

The offline training process begins with usage of a plurality of audio data sets as input (audio segment input 142) for training and tuning of an audio analysis model. As identified above, audio data sets may be weakly labeled data. Data that is weakly labeled is intended to mean that acoustic events of the data happen in a clip of a predetermined amount of time (e.g., 10 seconds) but may not last the entire clip duration. As such, the AI models are tuned to better classify target and non-target classes associated with a specific AI model. During training, processing operation 142 may comprise dividing an audio clip/stream into segments of a predetermined duration (e.g., 1 second) and labeling the data for that segment and the overall audio clip/stream. In doing so, segments associated with a specific audio clip/stream may inherit parent labels (e.g., labels for the entirety of the audio clip/stream). Furthermore, labels used for tuning classification may be multi-class multi-label, where labels can be used to identify multiple acoustic events in a segment and/or audio stream.

Flow of process flow 140 may proceed to processing operation 144, where acoustic feature extraction occurs from segmented audio. General processing for feature extraction of audio data is known to one skilled in the field of art. To extract acoustic features from audio segments, one or more audio analysis tools may be applied to the segmented audio. Non-limiting examples of such audio analysis tools comprise but are not limited to SOX and Kaldi, among other examples. As indicated in the foregoing description, feature extract is geared towards extracting acoustic features from segments of audio. Non-limiting examples of such acoustic features have been provided in the foregoing description. Feature extraction may further comprise identification of frames of an audio stream and acoustic features present therein.

Process flow 140 may proceed to execution of processing to tune audio analysis models to identify user reactions during live presentations. This may comprise execution of one or more of processing operations 146 and 148, where AI processing is applied to audio analysis models. For instance, a neural network such as a convolutional neural network CNN or RNN may be applied to provide one or more layers of abstraction to create a usable mapping of inputs (e.g., acoustic features) to outputs (e.g., classification predictions and/or preference for generating reaction indications). General processing for training and updating AI modeling (including neural networks) is known to one skilled in the field of art. Above what is traditionally known, a set of model weights may be applicable that are specific to the processing purposes described in foregoing description including classification prediction of audio streams relative to target classes and/or non-target classes; intensity analysis; and features for generation of reaction indications, among other examples. Through iterative processing, audio analysis models may be tuned to achieve precision accuracy and efficiency at desired thresholds for developers.

Moreover, in some examples, an additional level of deep learning may be applied to improve the accuracy of exemplary audio analysis models (e.g., specifically trained AI models). For instance, processing operation 148 describes the usage of an attention layer, which is a trained layer of AI processing (e.g., CNN, RNN, Transformer or the like) that is specifically configured to draw correlations between acoustic feature data and classification predictions usable to classify audio streams and/or generate reaction indications. An exemplary attention layer is trained deep learning processing that providing weighting analysis on a plurality of vectors to draw correlations between any of: frames of audio streams for audio stream classification; multiple audio streams; and intensity determinations of one or more audio streams, among other examples. For instance, weighting may be applied to specific acoustic features that correlate with audio signals which most closely reflect those that indicate target classes of user reactions. As such, the attention layer provides additional weighting that can help determine the most import signal data (or aspects thereof) to focus on or provide attention to while further tailoring AI processing for the specific purposes described herein. This analysis may be extremely beneficial when applied to help customize exemplary reaction indications for different contextual scenarios.

The final step of offline training is generation and evaluation of output (processing operation 150). As indicated in the foregoing description, deep learning training is an iterative process. Developers may set threshold levels of precision/accuracy, which may need to be met before offline training is complete and a trained AI model is ready for online data surfing. In processing operation 150, a threshold for precision/accuracy in generation classification predictions and/or reaction indications may be utilized to evaluate the readiness of a trained AI model (e.g., audio analysis model). In examples where the threshold is satisfied, the trained AI model may be exposed for online data surfing. In examples where the threshold remains unsatisfied, another iteration of training may be executed. In some examples, developers may provide manual feedback including labeling to help improve classification predictions. For instance, a classification prediction may be marked as correct (or incorrect) through manual review by users, which can help the trained AI adaptively learn to improve classification predictions.

Figure 1D:
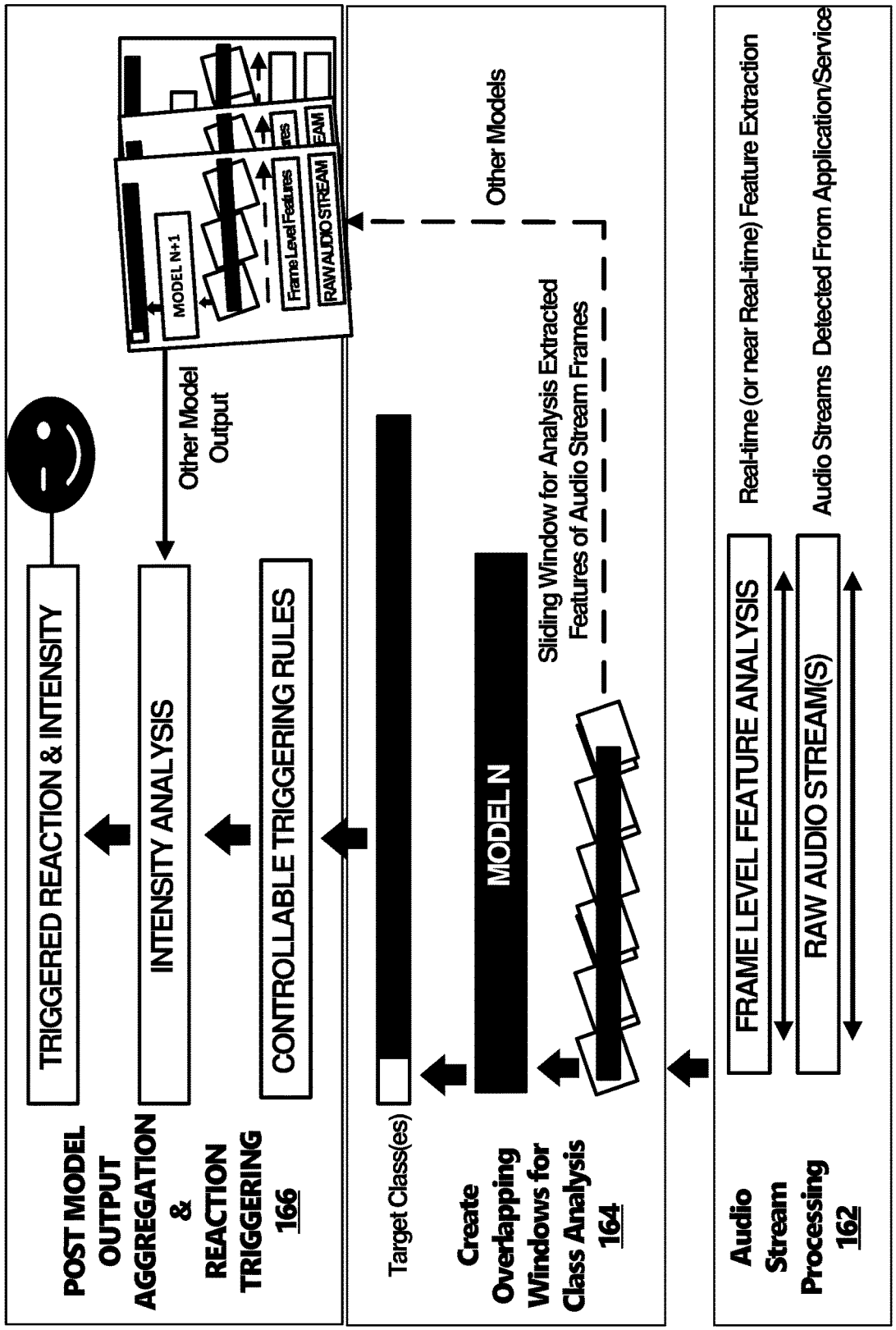
FIG. 1D illustrates an exemplary process flow providing non-limiting examples of processing executed to automatically generate reaction indications to live presentations, with which aspects of the present disclosure may be practiced.

FIG. 1D illustrates an exemplary process flow 160 providing non-limiting examples of processing executed to automatically generate reaction indications to live presentations, with which aspects of the present disclosure may be practiced. Process flow 160 provides a non-limiting example of online data surfing (e.g., distributed access to trained AI processing) that can generate reaction indications and automatically provide the same to a user without requiring user to take actions to select specific feedback to provide. For ease of explanation, process flow 160 may recount some of the processing operations previously described in the foregoing description without providing explicit technical details which have been previously discussed.

Process flow 160 begins with processing operation 162, where audio stream processing is executed in real-time (or near real-time). Processing 162 may comprise detecting (or receiving) raw audio streams; executing feature extraction processing on the audio segment to get to the frame level of an audio stream (including labeling of frames thereof); selection of an appropriate trained AI model to analysis the audio stream; and propagating the segmented audio stream for application by one or more specifically trained AI models.

As indicated in the foregoing description, a trained AI model may be selected for application based on a user identification associated with an audio stream (e.g., presenter, on-site audience, remote audience). Once a trained AI model is selected for application, that trained AI model is applied to execute class analysis (processing operation 164) on the one or more audio streams. In doing so, an overlapping window is utilized and rolled over the audio stream for evaluation purposes. An exemplary rolling window creates an overlap (e.g., 10 second clip) which can be used to individually evaluate frames of an audio stream as well as enable the trained AI processing to aggregate frames for a collective/aggregate analysis. For each window, the trained AI modeling generates scores for each class (target and non-target) and a model prediction is provided. This process may be repeated to analyze different audio streams associated with a live presentation.

Subsequent to the analysis of one or more audio streams by an audio analysis model (e.g., trained AI modeling), process flow 160 may proceed to execute post model output aggregation and reaction triggering (processing operation 166). Processing operation 166 may comprise execution of processing that applies controllable triggering rules; derives a final classification prediction for one or more audio streams and generates an intensity analysis determination for the one or more audio streams. Such analysis data may be used to generate exemplary reactions indications as described in the foregoing description. Processing to apply controllable triggering rules, intensity analysis and the generation of a triggered reaction/intensity have been described in the foregoing description. Furthermore, as referenced in the foregoing description, multiple audio analysis models may be applied concurrently to analyze audio streams from different users of live presentation. In examples where additional audio analysis models are applied, analysis results from respective audio analysis models may be aggregated and correlated to generate a more comprehensive evaluation of a user reaction to a live presentation. Processing operation 166 may comprise execution of operations that may cross-reference evaluation from different models in post model aggregation to generate a best possible reaction indication on behalf of a user. Processing operation 166 may further comprise processing that triggers generation and provision of a reaction indication. As an example, a reaction indication may be automatically shown in association with a live presentation (e.g., during the live presentation or in a summary report after the live presentation).

FIG. 2 illustrates an exemplary method related to automated processing of audio streams to generate reaction indications to a live presentation, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A) and process flows 120-160 (FIGS. 1B-1D respectively). Operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a component such as an acoustic analysis component 106 (of FIG. 1A). In distributed examples, processing operations described in method 200 may be implemented by one or more components connected over a distributed network. For example, components may be executed on one or more network-enabled computing devices, connected over a distributed network, that enable access to live presentations (e.g., live electronic presentations) through a presentation broadcast service. While some examples described herein reference content provided through a presentation service or presentation broadcast service, it is to be recognized that the present disclosure may be configured to work with any type of application/service in which content may be presented without departing from the spirit of the present disclosure. For instance, a GUI of an application/service may be adapted and configured to provide GUI elements that, when selected, enable presentation of content therethrough and analysis of audio streams to generate reaction indications described herein.

Method 200 begins at processing operation 202, where states of user connection to a live presentation are identified. As identified above, one or more different types of users may be connected to a live presentation (e.g., presenter(s), on-site audience, remote audience). State information for a user connection may be identified, for example, to determine whether audio streams of specific users are to be monitored. Exemplary state information may pertain to user configuration settings while attending a live presentation (e.g., live electronic presentation). Users may be presented, through a GUI of an application/service, GUI elements that enable users to control aspects of a live presentation such as whether they allow their audio streams to be monitored during the live presentation. In one example, audio monitoring may automatically initiate as part of operation of a presentation broadcasting application/service, where a user may elect to out of having their audio monitored. This technical instance may be consistent laws and regulations that protect user privacy, where the user may have previously consented to audio monitoring by agreeing to terms of usage of an application/service. In some instances, audio monitoring may not occur unless the user has explicitly authorized users may not wish to have their audio monitored or may have not given consent for audio monitoring. In such instances, audio may not be monitored unless a user explicitly enables audio monitoring (e.g., through a GUI of an application/service).

Furthermore, a presenter may be in control as to whether it would like to display user reaction (e.g., exemplary reaction indications) during a live presentation and/or receive indications of user reactions in a summary report after the completion of a live presentation. For example, an application/service that is used to present content associated with the live presentation (e.g., live electronic presentation) may provide GUI elements that enable a presenter to toggle control over how user feedback is presented. In technical instances where a presenter does not wish to see user feedback in real-time (e.g., as it may be a distraction to the presentation), then presentation of exemplary reaction indications may be suppressed during the live presentation. Summary feedback including reaction indications during a live presentation may still be provided to a presenter (and/or audience members) after the completion of a live presentation. This may be useful for a presenter to review how they did during the live presentation.

Flow of method 200 may proceed to processing operation 204. At processing operation 204, one or more audio streams are detected from users during a live presentation. This may occur based on the identification (processing operation 202) of the state of user connections to a live presentation. In one example, an application/service presenting content of the live presentation may propagate audio streams to an exemplary application/service that may execute processing operations for analysis thereof (e.g., that implements an exemplary acoustic analysis component 106 of FIG. 1A). In another technical instance, one or more components such as the acoustic analysis component may interface with an application/service through an API to gain access to audio streams during a live presentation.

In any example, flow of method 200 may proceed to processing operation 206, where audio streams of a live presentation may be pre-processed prior to executing any acoustic analysis. Pre-processing of audio streams has been described in the foregoing description and may comprise: executing feature extraction processing on the audio segment to get to the frame level of an audio stream (including labeling of frames thereof); identification of acoustic features of one or more frames of an audio stream; selection of an appropriate trained AI model to analysis the audio stream; and propagating the segmented audio stream for application by one or more specifically trained AI models. One or more trained AI models may be selected and applied to analyze the audio stream based on the classification of the type of user from which an audio stream is detected and an indication that the state of the user connection of a specific user allows for monitoring of audio streams. For instance, classification of a type of a user may occur based an identification of a locational classification (e.g., onsite or remote) of a user that is providing the audio stream. Separate audio analysis models (e.g., specifically trained AI models) may be applied to audio data received from each of the specific user classifications. For instance, audio data received for a presenter may be analyzed by audio analysis model$_{(P)}$, audio data received from one or more on-site audience members may be analyzed using audio analysis model$_{(o)}$ and audio data received from one or more audience members of the remote audience may be analyzed using audio analysis model$_{(R)}$. This may occur concurrently during a live presentation.

At processing operation 208, one or more trained AI models that are selected may be applied to analyze the one or more audio streams. Exemplary trained AI models are configured to automatically extract and analyze acoustic features of the audio stream as described in the foregoing description. Respective trained AI models (e.g., audio analysis models) may apply one or more classifiers trained to analyze acoustic features of audio signal data relative to target and non-target classes. That is, trained AI modeling may comprise trained data indicating target classes that each identify specific user reactions to the live electronic presentation as well as trained data indicating non-target classes that each identify audio types that are associated with the locational classification of the user. Extracted acoustic features of one or more frames of an audio stream may be correlated with audio signal data for the trained classes of the trained AI modeling based on evaluation of acoustic features comprising but not limited to: filter, bank, pitch, formant, probability of voicing, and harmony, among other examples. Each AI model applied may generate a model prediction for a frame of an audio stream.

Results of application of respective AI models may be propagated for an aggregation evaluation as described in the foregoing description. Aggregating frames of an audio stream may improve classification predictions for the one or more audio streams that are being analyzed. In doing so, controllable triggering rules may be applied to aggregate results from analysis of frames of one or more audio streams. Controllable triggering rules (or programmed rules) are predetermined rules configured that are utilized to generate or trigger a classification prediction for one or more audio streams. As such, the controllable triggering rules may be usable to evaluate any aspect for type classification of audio streams including intent derivation, cross-model correlation between audio streams analyzed by different models, aggregation of data from audio streams, determination of intensity of audio streams and generation of reaction indications, among other examples.

In some technical examples, flow of method 200 may proceed to processing operation 210 where analyzed audio streams from different trained AI models may be aggregated for an overall determination of a user reaction to a live presentation. While some examples may not require cross-model referencing because an audio reaction may be generated for an individual audio stream or a group of audio streams analyzed by the same trained AI model, processing operation 210 may aid precision and accuracy in generation of classification predictions. As referenced in the foregoing description, controllable trigger rules may further be applied to cross-reference audio signal data from different groups of users. For instance, an additional layer of evaluation may be executed that correlates a classification prediction from one group of users associated with a live presentation (e.g., presenter) with one or more other groups of users (e.g., audience members) associated with a live presentation. If applied, this may be one supplemental way to help confirm accuracy of a prediction by helping to decipher whether potential user reactions are actually directed to the presenter of a live presentation. Consider an example where a remote audience member is in a room with their dog and the dog is misbehaving. It is possible that the audience member may clap to get the dogs attention, which is obviously not intended as a reaction to the live presentation. In that scenario, correlation of signal data associated with the presenter and the audience member may attempt to determine if the clap of the audience member occurs when the presenter is mid-speech. Combine this insight with the types of audio signal data detected in the audience members' audio streams (e.g., dog barking) and there may be a more accurate indication as to whether a user reaction is intended for a live presentation. In further examples, aspects of presenter speech may be analyzed to help correlate audience member reactions with what is happening during the live presentation. For instance, the presenter may speak keywords (e.g., "end", "thank you", "feedback", "questions") which may be indicators that the presenter is looking for a reaction from the audience members. Combine this with potentially timed pauses in speech or silence from the presenter, which may be detected through acoustic analysis, and there may be a good indication that audio streams from the audience members may be intended as user reaction to the live presentation. As such, controllable triggering rules may be set by developers to cover scenarios where results of analysis of audio signal data from different audio analysis models may be utilized to help improve the accuracy in gauging user reactions.

Flow of method 200 may proceed to processing operation 212. At processing operation 212, one or more classification predictions may be generated for an audio stream. Classification predictions may pertain to a type classification of one or more audio streams, a prediction of user intent derived from an audio stream, and/or an intensity classification of one or more audio streams. As such, the controllable triggering rules may be usable to evaluate any aspect for type classification of audio streams, cross-model correlation between audio streams analyzed by different models, aggregation of data from audio streams, determination of intensity of audio streams and generation of reaction indications, among other examples. With respect to a type classification of an audio stream, a classification prediction may classify the type of audio detected in an audio stream. As indicated in the foregoing description, online data surfing during a live presentation may focus on the identification of user reactions during a live presentation (e.g., that correspond to the identified target classes). While other types of audio classification (e.g., non-target classes) may be filtered out, those signals may still be useful for AI training purposes and/or usable to provide summary information to one or more users. For instance, it may be useful to generate an alert for a user when there is a large amount of background noise that may potentially affect a live presentation.

In generating classification predictions, flow of method 200 may proceed to processing operation 214. At processing operation 214, an intensity of one or more user reactions may be determined. As indicated in the foregoing description, audio streams can be filtered to identify frames that pertain to target classes each identifying specific user reactions. An intensity of acoustic features from those filtered frames may be analyzed to improve the generation and provision of exemplary reaction indications. An exemplary intensity refers to an acoustic or sound intensity per frame of audio (acoustic features) in an audio stream, which can be aggregated to determine an overall intensity of one or more audio streams. As indicated in the foregoing description, controllable triggering rules may further be set to derive an intensity prediction from analysis of acoustic features of one or more audio streams. Developers may set controllable triggering rules to identify threshold determinations regarding aggregated characteristics from frames of one or more audio streams to determine attributes of sound intensity including but not limited to: an evaluation of a loudness of a type of audio event for one or more users; an evaluation of a length of a type of audio event for one or more users (e.g., how many frames of an audio stream does the audio event last); and an evaluation of an aggregate number of users who provide an audio event (e.g., how many users out of one or more groups of users), among other examples.

At processing operation 216, one or more reaction indications may be generated. Exemplary reaction indications provide feedback for live presentations that can be presented in real-time (or near real-time) without requiring a user to manually take action to provide any feedback. As an example, a reaction indication may then be generated that provides a visual representation of a user reaction to the live presentation. Generation of an exemplary reaction indication may occur based on a result of analysis of the one or more frames of the audio stream that correlate with the one or more of the target classes. In some examples, this may comprise an evaluation of a type of the one or more target classes identified for the one or more frames of the audio stream and/or a determination of the intensity associated with the specific user reactions detected in the audio stream and/or in aggregate with other audio streams. Exemplary reaction indications may be presented in a form that is easy to visualize and understand such as emojis or icons. Another example of a reaction indication is a GUI notification that provides a predictive indication of user intent which is derived from analysis of acoustic signals. However, reaction indications may be present any type of content in any format without departing from the spirit of the present disclosure.

In some instances, exemplary controllable triggering rules may be usable to generate (processing operation 216) a reaction indication. This may comprise rules set to determination how to select content to include in a reaction indication; rules specific to the selection of a layout and/or arrangement of content in a reaction indication; and rules set specifically to select a size or amount of content (e.g., icons) to include in a reaction indication, among other examples. For example, controllable triggering rules may be set to determine how to generate a reaction indication based on any attributes associated with a classification prediction for one or more audio streams including the type classification of an audio stream and an intensity evaluation thereof. In other technical examples, generation of an exemplary reaction indication may occur based on predetermined type of reaction indication that is matched based on identified classification predictions.

As indicated in the foregoing, an intensity evaluation of the present disclosure enables the acoustic analysis component 106 (FIG. 1A) to gain an aggregate understanding of an audio stream or group of audio streams (e.g., from a plurality of users). This evaluation can help determine how to present a reaction indication. For instance, determination of intensity of one or more audio streams may be utilized to select one or more of: a size of the reaction indication (or content provided thereof); a quantity of content (e.g., icons/emojis) for inclusion in the reaction indication; an arrangement of content included in the reaction indication; and a layout of content included in the reaction indication, among other examples. In examples where a reaction indication is generated for a plurality of audio streams (e.g., of a group of users), intensity determinations may be used to reflect the collective (or aggregate) view of a plurality of users. For instance, an aggregate reaction indication may be generated for a group of users that presents a summarized representation of content for a group of users rather than providing individual icons representative of each response by an audience member.

Flow of method 200 may then proceed to processing operation 218. At processing 218, data for rendering of an exemplary reaction indication may be transmitted to an application/service that may be configured to provide the reaction indication through its GUI. In some examples, this may occur in a distributed fashion over a network connection through interfacing with an application/service (e.g., presentation broadcasting service) that may be presenting a GUI through which the reaction indication may be provided. In some alternative examples, an acoustic analysis component may be an integrated component of an application/service (e.g., presentation broadcasting service) that provides a front-end GUI for presentation of an exemplary reaction indication. In such examples, a reaction indication may be automatically rendered for presentation through the application/service.

Next, the reaction indication may be rendered (processing operation 220) for display through a GUI of an application/service (e.g., presentation application/service, presentation broadcasting service). Rendering of the reaction indication may comprise providing the reaction indication through a GUI of an application/service. In some alternative examples, reaction indications may be rendered and presented in a summary reporting after the completion of a live presentation. In such technical instances, the reaction indication may be appropriately generated and rendered for inclusion in the summary reporting which may be presented though a GUI of an application/service or via a different application/service (e.g., emailed to a user, messaged to a user, etc.).

In any example, results from processing described herein may be logged (processing operation 222) for training purposes. For instance, data logs and/or training data may be stored in a distributed data repository that can be accessed at a later point in time when offline training/updating is to be executed. Over time, trained AI processing may be continually updated. This may further occur based on feedback received through user interaction with an application/service and/or generated reaction indications, which may also be logged and utilized for update of trained AI processing.

Figure 3A:
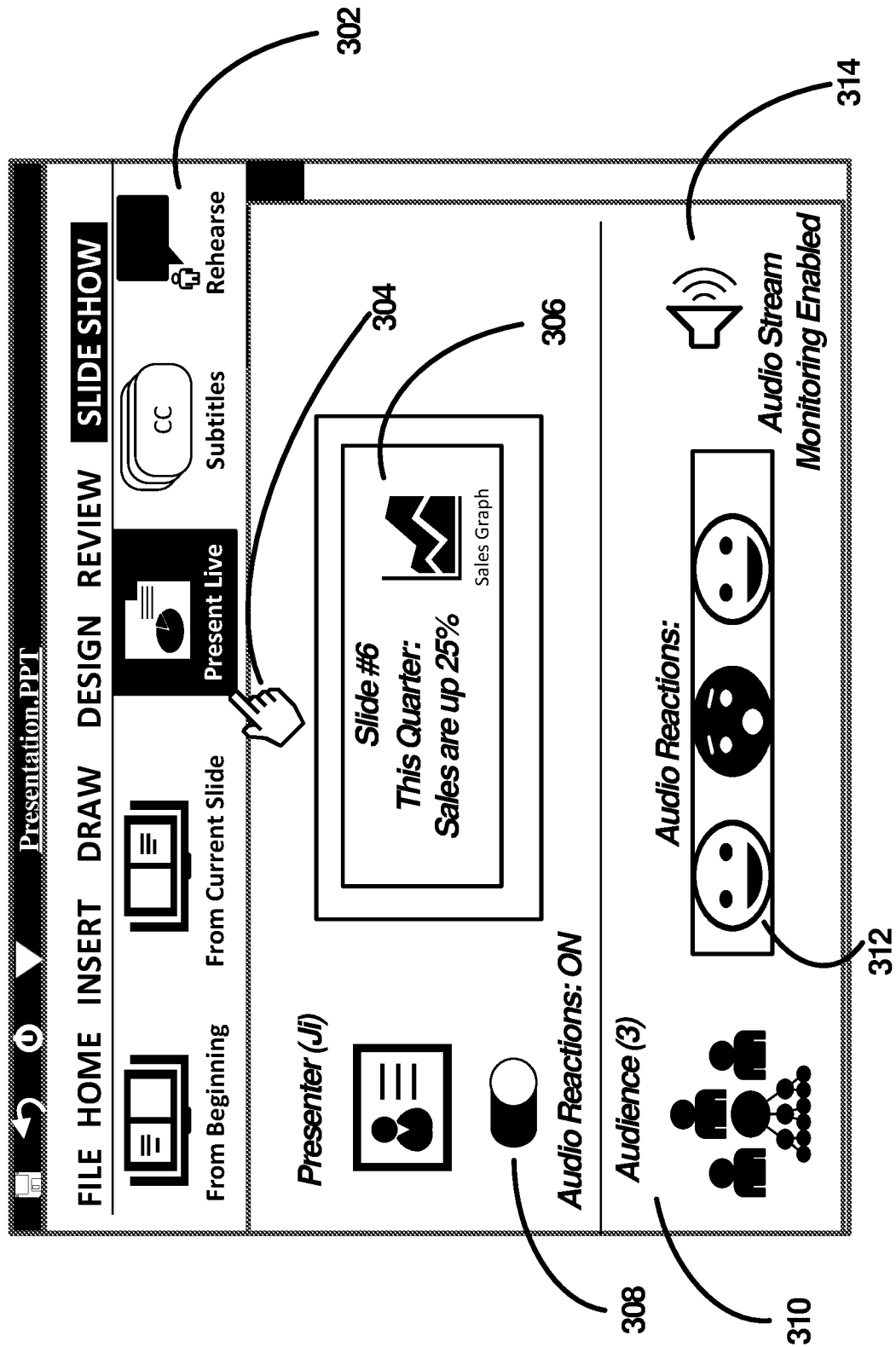
FIGS. 3A-3C illustrate exemplary processing device views associated with user interface examples for an improved user interface that is configured to enable provision of graphical user interface elements for provision of exemplary reaction indications to a live presentation, with which aspects of the present disclosure may be practiced.
Figure 3B:
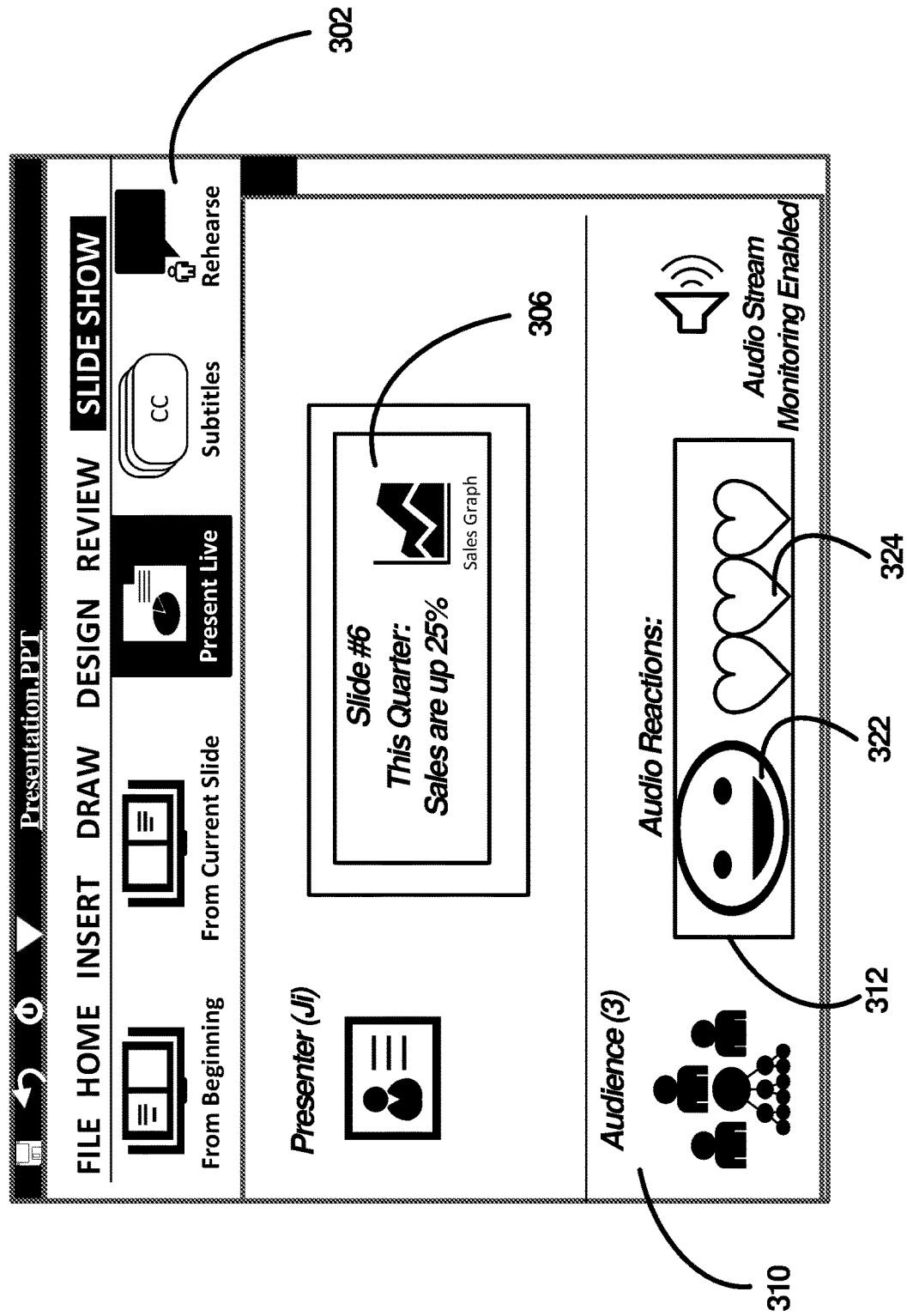
Figure 3C:
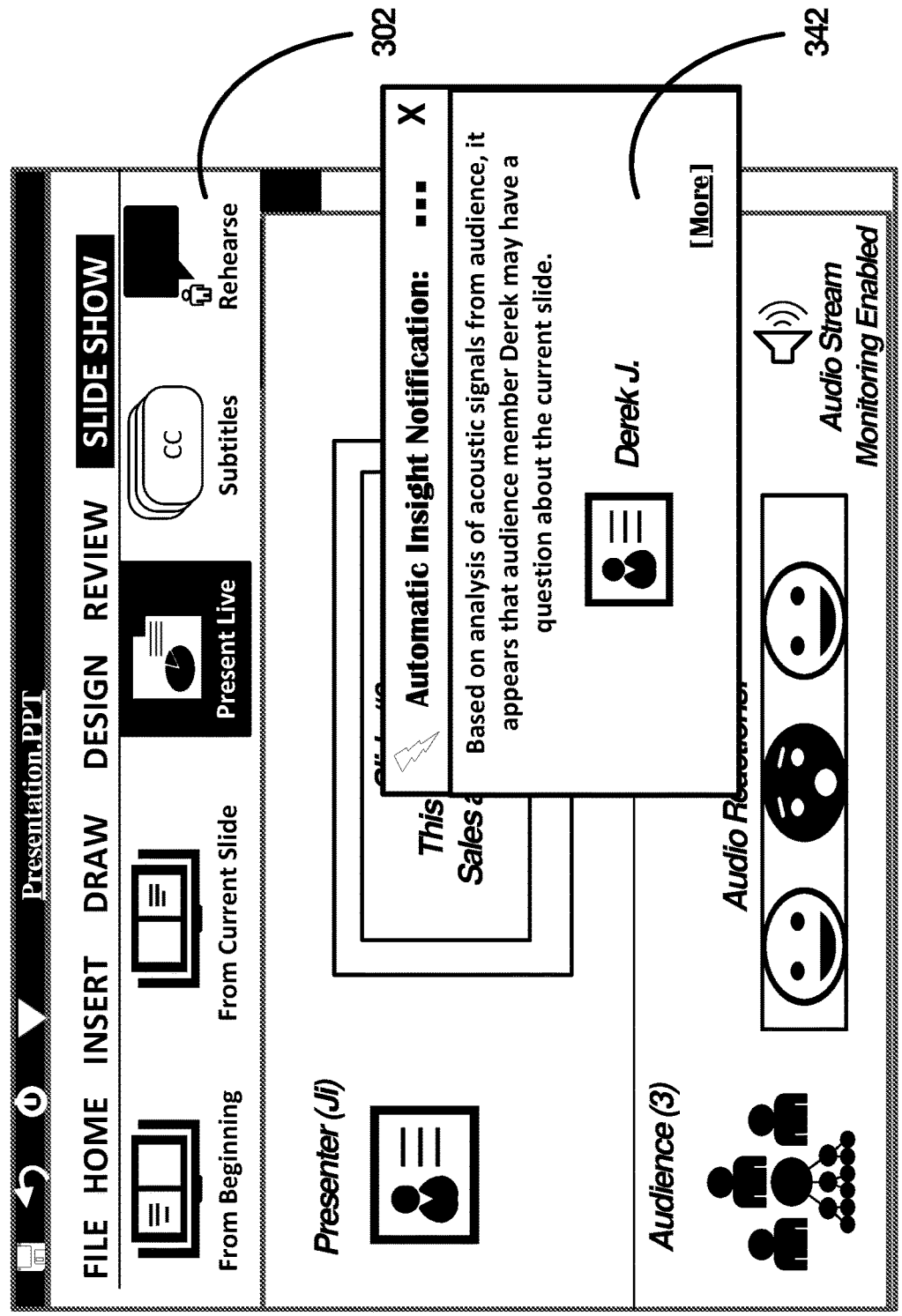

FIGS. 3A-3C illustrate exemplary processing device views associated with user interface examples for an improved user interface that is configured to enable provision of graphical user interface elements for provision of exemplary reaction indications to a live presentation, with which aspects of the present disclosure may be practiced. FIGS. 3A-3C provide non-limiting front-end examples of processing described in the foregoing including system diagram 100 (FIG. 1A), process flows 120-160 (FIG. 1B-1D respectively) and method 200 (FIG. 2).

FIG. 3A presents processing device view 300, illustrating a GUI of an application/service (e.g., presentation application/service) that is configured to enable user control over (and presentation of) a live presentation. Processing device view 300 illustrates a configuration of an adapted GUI that is configured to provide an application command control 302 (e.g., GUI ribbon) providing GUI menu elements that are usable to control a live presentation. For instance, user action 304 selects a GUI menu element from the application command control 302, where the selected GUI menu element is configured to initiate a live presentation through a presentation application/service. This may enable a presenter to present content through a live presentation (e.g., via the presentation application/service) which is accessible to a plurality of audience members. The audience members may connect to the live presentation remotely and/or be present in the same physical location of the presenter and potentially computing devices, hardware, systems, etc., used to present content of the live presentation. Non-limiting examples of methods of joining a live presentation are described in the foregoing description. In the example shown in processing device view 300, the presenter is presenting slide content 306 as part of the live presentation (e.g., "slide #6"). Audience members may be following along as the presenter proceeds through its slide deck.

Furthermore, processing device view 300 further illustrates GUI elements that provide user control for management of aspects of a live presentation. For instance, a first selectable GUI feature 308 is presented which is configured to enable the presenter to control whether audio reactions from the audience may be automatically provided for the presenter during the live presentation. In the example shown in FIG. 3A, the first selectable GUI feature 308 is toggled to "ON" thereby enabling audio reactions to be displayed for the presenter and/or other users attending the live presentation. A first GUI element 310 is further displayed in processing device view 300, where the first GUI element 310 is configured to identify the number of audience members connected to the live presentation.

Continuing the above example, as the first selectable GUI feature 308 is activated, reaction indication(s) 312 may be automatically displayed for the presenter and/or users connected to the live presentation without requiring audience members take action to provide feedback. The reaction indication(s) 312 may be automatically presented based on the back-end processing executed by the acoustic analysis component 106 (FIG. 1A) and/or other components described herein that are interfacing with the acoustic analysis component 106. Exemplary reaction indication(s) 312 provide feedback for live presentations that can be presented in real-time (or near real-time) without requiring a user to manually take action to provide any feedback. As a non-limiting example, reaction indications may be presented in a form that is easy to visualize and understand such as emojis or icons. In the example shown in processing device view 300, the reaction indication(s) comprise emojis that are reflective of audio stream analysis from audience members during the presentation of the slide content 306 by the presenter. In some examples, an exemplary emoji, provided within the reaction indication(s) 312, may be reflective of analysis of an audio stream of a single user and in other example an exemplary emoji may be reflective of analysis of a plurality of audio streams in aggregate (e.g., of a plurality of users).

Moreover, processing device view 300 further illustrates a second selectable GUI feature 314 which may be configured to enable users to control whether they would like their audio stream monitored. In the example shown in processing device view 300, the second selectable GUI feature 314 is activated so audio stream monitoring is activated for a user (e.g., presenter or audience member) that is accessing the live presentation through the presentation application/service. This results in the reaction indication(s) 312 being displayed in the GUI of the presentation application/service during the presenting of the live presentation.

FIG. 3B presents processing device view 320, illustrating a continued example of the GUI of an application/service (e.g., presentation application/service) shown in processing device view 300 (FIG. 3A). In the example shown in processing device view 320, the reaction indication(s) 312 has updated to present a first emoji 322 and a string of second emojis 324. As can be seen in processing device view 320, the presentation (e.g., size, layout, arrangement) of the respective emojis is varied, which is a visual result of the backend processing described herein which comprises an intensity determination for display of content within an exemplary reaction indication. The first emoji 322 is displayed at a larger size relative to other emojis/icons, which may be reflective of a determination that an attribute of the intensity evaluation (e.g., loudness of the audio stream) was quite strong. The string of second emojis 324 presents the same emoji repetitively in a string which may be reflective of a determination that multiple different audio streams had the same user reaction to the presentation of the slide content 306 when audio streams were analyzed in aggregate. These are just a few non-limiting examples of ways in which reaction indication(s) 312 can be customized for a live presentation.

FIG. 3C presents processing device view 340, illustrating an alternative example of reaction indication(s). In the example shown in processing device view 340, an exemplary reaction indication is displayed as a GUI notification 342 that provides a predictive indication of user intent which is derived from analysis of acoustic signals. As indicated in the foregoing description, results of acoustic analysis of audio streams can be utilized to generate intent determinations that take other forms rather than emojis or icons, where the acoustic analysis component 106 (FIG. 1A) can be trained to execute intent determination analysis to predict whether the user may wish to take an action with respect to a live presentation. As an example of other types of GUI notifications pertaining to signal intent determination may be a predictive indication of user intent which is derived from analysis of acoustic signals. Non-limiting examples of such predictions comprise but are not limited to: predictions as to whether a user intends to ask a question, interject, provide verbal feedback, etc. In at least one example, controllable triggering rules may be programmed and applied to predict a user intent from one or more frames of an audio stream or multiple audio streams taken in aggregate. In generating a reaction indication, an acoustic analysis component may be configured to apply controllable triggering rules to select a predicted user intent and a visual representation of how to present that predicted user intent to users during the live presentation. This is yet another way in which the present disclosure provides technical advantages over what is feasible with traditional presentation systems and methods.

In the example shown in processing device view 340, the GUI notification 342 is a notification that acoustic analysis of audio streams has yielded a prediction that a user ("Derek J") may have a question about the current slide being displayed during the live presentation. In traditional examples, a user would have to take manual action through a computing device (e.g., select GUI elements or enter a message to indicate that they have a question) or attempt to speak over other users that may be speaking as well. When there are a lot of users interacting, it may be difficult for a user to get a word in or their speech may be drown-out by other users. Training AI processing to identify user intent that may arise in these technical instances can help solve this technical challenge but automatically raising a notification (e.g., GUI notification 342) to help the presenter identify that an audience member may have a question or comment.

Figure 4:
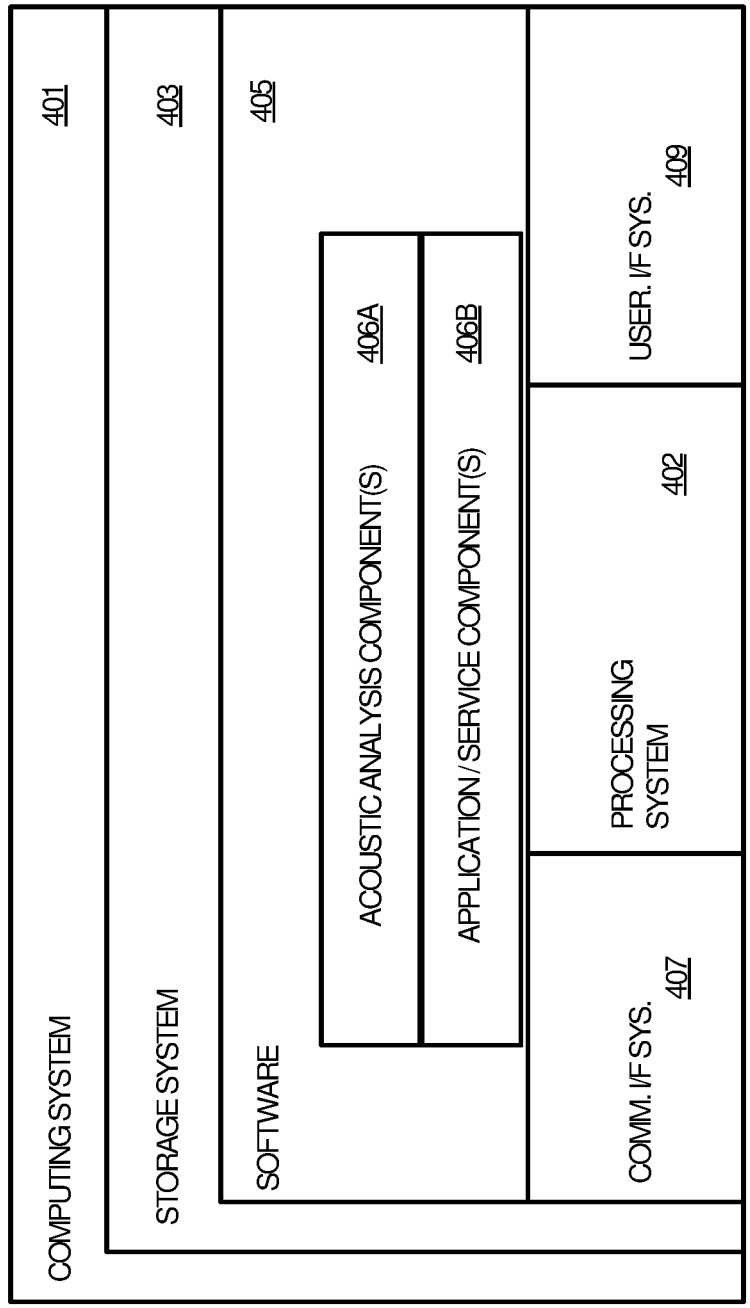
FIG. 4 illustrates a computing system suitable for implementing processing operations described herein related to generation and provision of reaction indications to a live presentation, with which aspects of the present disclosure may be practiced.

FIG. 4 illustrates a computing system 401 suitable for implementing processing operations described herein related to generation and provision of reaction indications to a live presentation, with which aspects of the present disclosure may be practiced. As referenced above, computing system 401 may be configured to implement processing operations of any component described herein including the linguistic analysis component(s). As such, computing system 401 may be configured to execute specific processing operations to solve the technical problems described herein, which comprise processing operations for analyzing acoustic aspects of audio streams, generation of reaction indications to live presentation (e.g., live electronic presentations) and rendering/provisioning of exemplar reaction indications. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), process flow 120 (FIG. 1B), process flow 140 (FIG. 1C), process flow 160 (FIG. 1D), processing operations described in method 200 (FIG. 2) and/or the accompanying description of FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more acoustic analysis component(s) 406a as described herein. Software 405 may further comprise application/service component(s) 406b that provide applications/services as described in the foregoing description such as applications/services that enable user access to electronic documents including live (electronic) presentations, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: application command control specifically configured for managing control over live presentations of content; an improved GUI providing automatic notifications of reaction indicators/indications (e.g., emojis, icons, notifications of predictive intent) before, during and/or after a live presentation; data analysis insights including insights generated from acoustic analysis of audio streams (individually or collectively); improved GUI menus to manage automated processing generation and rendering of reaction indicators/indications, or any combination thereof. User interface system 409 comprises a graphical user interface that presents graphical user interface elements representative of any point in the processing described in the foregoing description including processing operations described in system diagram 100 (FIG. 1A), process flows 120-160 (FIGS. 1B-1D respectively), method 200 (FIG. 2) and front-end representations related to the description of FIGS. 3A-3C. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., presentation broadcast service) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   providing a presenter graphical user interface (GUI) to a presenter of a live presentation via a cloud-based service, wherein the presenter GUI comprises a first panel comprising electronic data for presentation during the live presentation and a second panel comprising audience data related to audience members of the live presentation;
   providing an audience GUI to the audience members accessing the live presentation via the cloud-based service for the audience members to view the live presentation;
   receiving a plurality of audio streams via the audience GUI, wherein each audio stream is from one of the audience members;
   for each audio stream:
     selecting, based on a classification of the respective audience member, a trained artificial intelligence (AI) model from a plurality of trained AI models each trained for a specific classification, wherein the trained AI model is configured to automatically analyze acoustic features of the audio streams, applying the selected AI model to the audio stream, and generating reaction indications for the respective audience member, each reaction indication of the reaction indications providing a visual representation of user reactions to a portion of the live presentation based on a result of the analysis of the acoustic features of the audio stream; and
   updating the presenter GUI with the reaction indications as the reaction indications are generated during the live presentation.

2. The computer-implemented method of claim 1, wherein the presenter GUI comprises a selectable GUI feature to toggle reaction indication updates on and off.

3. The computer-implemented method of claim 1, wherein each of the reaction indications is an emoji that is visually representative of a specific user reaction to the live presentation based on an audio stream associated with a specific user.

4. The computer-implemented method of claim 3, wherein a presentation of the emoji is based on an intensity of the reaction indication.

5. The computer-implemented method of claim 4, wherein the intensity is determined based on a volume of the audio stream associated with the specific user.

6. The computer-implemented method of claim 4, wherein the intensity is determined based on a number of the plurality of audio streams having a same user reaction.

7. The computer-implemented method of claim 1, wherein each of the reaction indications is an emoji that is visually representative of aggregated user reactions to the live presentation.

8. The computer-implemented method of claim 1, wherein at least one reaction indication is a notification providing a suggested intent for the respective audience member to aid interaction during the live presentation.

9. The computer-implemented method of claim 1, wherein the audience GUI comprises a selectable GUI feature to control whether an audio stream of the respective audience member is monitored and included in the reaction indications.

10. The computer-implemented method of claim 1, wherein the classification is a locational classification.

11. A system comprising:
    at least one processor; and
    a memory, operatively connected with the at least one processor, storing computer-executable instructions that, upon execution by the at least one processor, cause the at least one processor to:
      provide a presenter graphical user interface (GUI) to a presenter of a live presentation via a cloud-based service, wherein the presenter GUI comprises a first panel comprising electronic data for presentation during the live presentation and a second panel comprising audience data related to audience members of the live presentation;
      provide an audience GUI to the audience members accessing the live presentation via the cloud-based service for the audience members to view the live presentation;
      receive a plurality of audio streams via the audience GUI, wherein each audio stream is from one of the audience members;
      for each audio stream:
        select, based on a classification of the respective audience member, a trained artificial intelligence (AI) model from a plurality of trained AI models each trained for a specific classification, wherein the trained AI model is configured to automatically analyze acoustic features of the audio streams, apply the selected AI model to the audio stream, and generate reaction indications for the respective audience member, each reaction indication of the reaction indications providing a visual representation of user reactions to a portion of the live presentation based on a result of the analysis of the acoustic features of the audio stream; and update the presenter GUI with the reaction indications as the reaction indications are generated during the live presentation.

12. The system of claim 11, wherein the presenter GUI comprises a selectable GUI feature to toggle reaction indication updates on and off.

13. The system of claim 11, wherein each of the reaction indications is an emoji that is visually representative of a specific user reaction to the live presentation based on an audio stream associated with a specific user.

14. The system of claim 13, wherein a presentation of the emoji is based on an intensity of the reaction indication.

15. The system of claim 14, wherein the intensity is determined based on a volume of the audio stream associated with the specific user.

16. The system of claim 14, wherein the intensity is determined based on a number of the plurality of audio streams having a same user reaction.

17. The system of claim 11, wherein each of the reaction indications is an emoji that is visually representative of aggregated user reactions to the live presentation.

18. The system of claim 11, wherein at least one reaction indication is a notification providing a suggested intent for the respective audience member to aid interaction during the live presentation.

19. The system of claim 11, wherein the audience GUI comprises a selectable GUI feature to control whether an audio stream of the respective audience member is monitored and included in the reaction indications.

20. The system of claim 11, wherein the classification is a locational classification.

* * * * *